(12) United States Patent
Yokobori et al.

(10) Patent No.: US 12,375,793 B2
(45) Date of Patent: Jul. 29, 2025

(54) CAMERA MODULE AND IC CHIP

(71) Applicant: Asahi Kasei Microdevices Corporation, Tokyo (JP)

(72) Inventors: Takumi Yokobori, Tokyo (JP); Takashi Fukushima, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 90 days.

(21) Appl. No.: 18/299,067

(22) Filed: Apr. 12, 2023

(65) Prior Publication Data
US 2023/0388619 A1 Nov. 30, 2023

(30) Foreign Application Priority Data

May 31, 2022 (JP) .................................. 2022-088490

(51) Int. Cl.
*H04N 23/57* (2023.01)
*H04N 23/54* (2023.01)
*H04N 23/68* (2023.01)

(52) U.S. Cl.
CPC ............. *H04N 23/57* (2023.01); *H04N 23/54* (2023.01); *H04N 23/681* (2023.01)

(58) Field of Classification Search
CPC ...... H04N 23/57; H04N 23/54; H04N 23/681; H04N 23/55; H04N 23/687; H04N 23/50; H04N 23/6812; G02B 27/646; G02B 7/04; G03B 5/06; G03B 17/02; G03B 30/00; G03B 2205/0015; G03B 2205/0069; H02K 11/215; H02K 41/0356
See application file for complete search history.

(56) References Cited

U.S. PATENT DOCUMENTS

| | | | |
|---|---|---|---|
| 7,881,598 B1 * | 2/2011 | Wu | G03B 3/10 396/55 |
| 11,683,588 B2 | 6/2023 | Tabuchi | |
| 2005/0258822 A1 | 11/2005 | Hara | |
| 2011/0176012 A1 | 7/2011 | Yagisawa | |
| 2012/0114322 A1 | 5/2012 | Saito | |
| 2014/0205274 A1 * | 7/2014 | Wu | G03B 17/00 396/55 |

(Continued)

FOREIGN PATENT DOCUMENTS

| | | |
|---|---|---|
| CN | 105573014 A | 5/2016 |
| EP | 2840770 A2 | 2/2015 |

(Continued)

*Primary Examiner* — Ahmed A Berhan

(57) ABSTRACT

There is provided a camera module including: a movable body including an optical element; a fixed portion having a surface facing the movable body in a direction intersecting an optical axis of the optical element; a first drive unit having a portion arranged on a first surface of the movable body, for generating a first driving force for moving the movable body in a first direction; a second drive unit having a portion arranged on a second surface of the movable body different from the first surface, for generating a second driving force for moving the movable body in a second direction intersecting the first direction; and a position sensing unit arranged on a surface of the fixed portion facing the first surface of the movable body, or on the first surface of the movable body, for detecting positions in the first and second directions of the movable body.

23 Claims, 24 Drawing Sheets

(56) References Cited

U.S. PATENT DOCUMENTS

| | | |
|---|---|---|
| 2015/0350507 A1 | 12/2015 | Topliss |
| 2016/0327806 A1 | 11/2016 | Kasamatsu |
| 2018/0249082 A1 | 8/2018 | Saito |
| 2018/0275369 A1 | 9/2018 | Takahashi |
| 2018/0284568 A1 | 10/2018 | Oh |
| 2018/0292670 A1 | 10/2018 | Takahashi |
| 2018/0343393 A1 | 11/2018 | Maede |
| 2018/0352161 A1 | 12/2018 | Heo |
| 2019/0204531 A1 | 7/2019 | Sugawara |
| 2020/0153366 A1 | 5/2020 | I |
| 2020/0174219 A1 | 6/2020 | Sugawara |
| 2021/0011299 A1 | 1/2021 | Matsui |
| 2021/0333567 A1 | 10/2021 | Jeong |
| 2021/0333568 A1 | 10/2021 | Okada |
| 2022/0174198 A1 | 6/2022 | Wang |
| 2022/0224839 A1 | 7/2022 | Maede |
| 2022/0294937 A1 | 9/2022 | Furukawa |
| 2023/0388619 A1 | 11/2023 | Yokobori |

FOREIGN PATENT DOCUMENTS

| | | |
|---|---|---|
| JP | 2005242326 A | 9/2005 |
| JP | 2007114121 A | 5/2007 |
| JP | 2014085629 A | 5/2014 |
| JP | 2018200457 A | 12/2018 |
| JP | 7138261 B1 | 9/2022 |
| JP | 7190604 B1 | 12/2022 |
| KR | 20200020325 A | 2/2020 |

\* cited by examiner

CAMERA MODULE AND IC CHIP

The contents of the following Japanese patent application (s) are incorporated herein by reference:
NO. 2022-088490 filed in JP on May 31, 2022

BACKGROUND

1. Technical Field

The present invention relates to a camera module and an IC chip.

2. Related Art

A camera module that uses a magnetic sensor to detect a position of a lens is known (for example, refer to Patent Documents 1 and 2).

PRIOR ART DOCUMENT

Patent Document

[Patent Document 1] Japanese Patent Application Publication No. 2021-51277
[Patent Document 2] US2021/0333567

DESCRIPTION OF EXEMPLARY EMBODIMENTS

Hereinafter, the present invention will be described through embodiments of the invention, but the following embodiments do not limit the invention according to the claims. In addition, not all combinations of features described in the embodiments are essential to the solution of the invention.

In the present specification, one side in a direction parallel to an optical axis of a lens may be referred to as an "upper" side, and the other side may be referred to as a "lower" side. "Upper" and "lower" directions are not limited to a direction parallel to a direction of gravity.

In the present specification, in a case where a magnitude or an amount is described as "same" or "equal", the case may include a case where there is an error due to a variation in manufacturing or the like. The error is, for example, within 5%. In addition, in a case where an angle is described as "parallel", "perpendicular", or "orthogonal", the case may include a case where there is an error due to a variation in manufacturing or the like. The error is, for example, within 5 degrees.

First Embodiment

Figure 1:
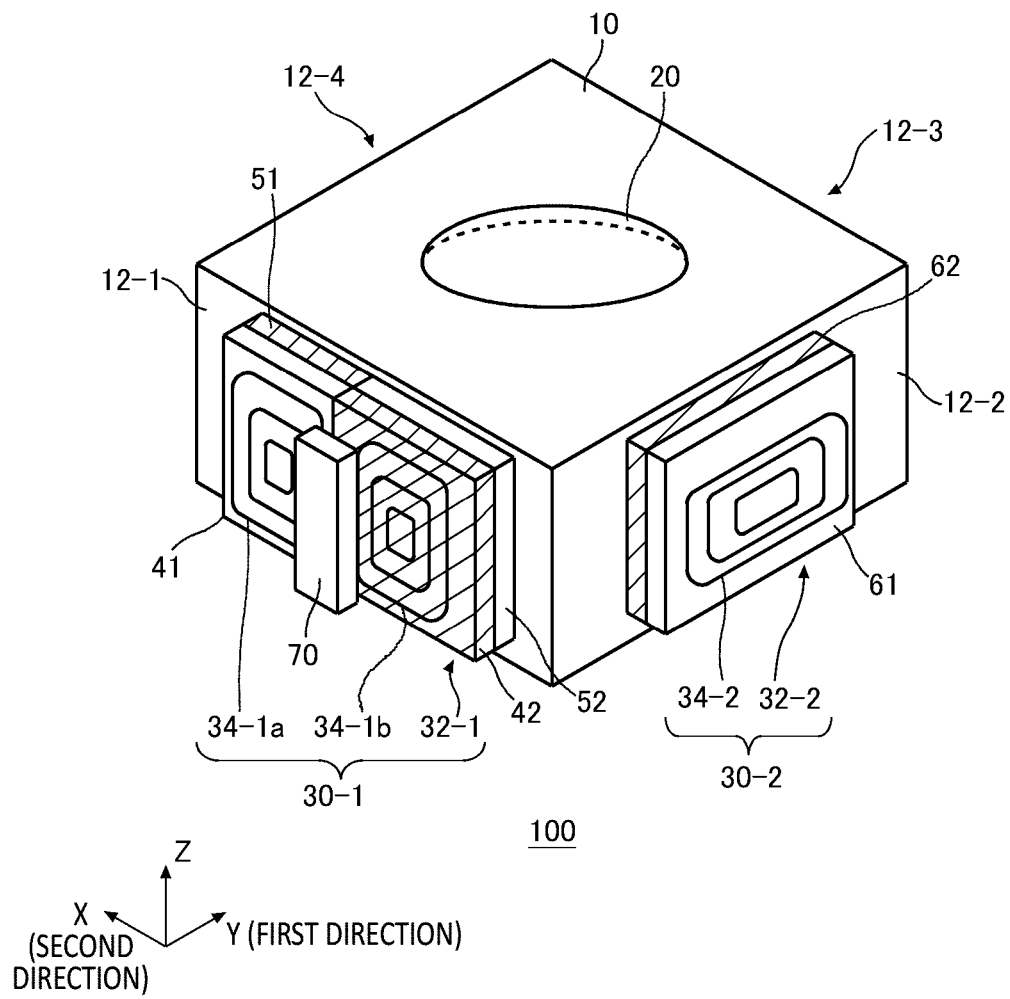
FIG. 1 is a perspective view showing an example of a camera module 100 according to a first embodiment of the present invention.

FIG. 1 is a perspective view showing an example of a camera module 100 according to a first embodiment of the present invention. The camera module 100 is provided in a camera or a mobile device with a camera function. The camera module 100 includes a movable body 10 including an optical element 20. The optical element 20 is an image capturing unit such as a lens or a CMOS image sensor. The movable body 10 adjusts a relative position between the lens and the image capturing unit by moving one of the lens and the image capturing unit with respect to the other one. In each embodiment, an example in which the movable body 10 includes a lens and moves the lens will be described; however, the movable body 10 may include the image capturing unit and move the image capturing unit. In a case where the movable body 10 moves the image capturing unit, the camera module 100 has a function and a configuration similar to the case where the movable body 10 moves the lens. In the present specification, an axis parallel to an optical axis of the optical element 20 (the lens in the present example) is a Z axis, and two axes orthogonal to the Z axis are an X axis and a Y axis. The X axis and the Y axis are orthogonal to each other. In the present specification, the optical axis of the optical element 20 may be simply referred to as the optical axis. Below the lens (on a negative direction side of the Z axis), the image capturing unit such as the CMOS image sensor that receives light that has passed through the lens is provided, but illustration thereof is omitted in FIG. 1. The optical axis of the lens is an axis that connects a center point and a focal position on an XY plane of the lens. A normal to an upper surface of the lens, at the center point of the XY plane of the lens, may be set as the optical axis. In addition, even when the image capturing unit is provided as the optical element 20, the optical axis of the lens may be treated as the optical axis of the optical element 20. In another example, a normal to an image capturing surface, at the center of the image capturing surface of the image capturing unit, may be the optical axis of the optical element 20.

The movable body 10 has a plurality of surfaces 12. As an example, a surface 12 is a surface parallel to the optical axis of the optical element 20; however, the surface 12 may have an angle with respect to the optical axis. In the example of FIG. 1, the movable body 10 is a rectangular parallelepiped or a cube, and has four surfaces 12 including a first surface 12-1 to a fourth surface 12-4 that are side surfaces parallel to the optical axis. In another example, the movable body 10 may have three surfaces 12, or may have five or more surfaces 12. Each surface 12 in the example of FIG. 1 is perpendicular to either of the Y axis or the X axis. In the example of FIG. 1, the first surface 12-1 and the third surface 12-3 are parallel to the XZ plane, and the second surface 12-2 and the fourth surface 12-4 are parallel to a YZ plane. Each surface 12 is planar, but may include a curved portion or an uneven portion.

The movable body 10 is provided to be able to move in at least two directions. The movable body 10 may be able to move in the direction parallel to the optical axis. By moving the movable body 10 in the direction parallel to the optical axis, for example, it is possible to control the focal position of the optical element 20. In addition, the movable body 10 may be able to move in a direction intersecting the optical axis. Intersecting means not being parallel. The movable body 10 may be able to move in one or more directions orthogonal to the optical axis. By moving the movable body 10 in a direction different from the optical axis, it is possible to offset a vibration of a device in which the camera module 100 is provided, and to capture an image with less blur. The movable body 10 of the present example is able to move in directions of at least two axes of the X axis, the Y axis, or the Z axis. The movable body 10 may be provided with one of the lens and the image capturing unit, without being provided with the other one. In this way, by the movable body 10 moving, one of the lens and the image capturing unit moves relative to the other one.

The camera module 100 includes a plurality of drive units 30. The drive unit 30 generates a driving force for moving the movable body 10. The drive unit 30 may move the movable body 10 by a magnetic force, may move the movable body 10 by using a piezoelectric element, or may move the movable body 10 by another method. In the present example, at least one drive unit 30 moves the movable body 10 by the magnetic force. All of the drive units 30 may move the movable body 10 by the magnetic force.

The camera module 100 of the present example includes a first drive unit 30-1 and a second drive unit 30-2. The first drive unit 30-1 has a portion arranged on the first surface 12-1 of the movable body 10, and is configured to generate a first driving force for moving the movable body 10 in a first direction. The first driving force may be the magnetic force. The second drive unit 30-2 has a portion arranged on the second surface 12-2 of the movable body 10, and is configured to generate a second driving force for moving the movable body 10 in a second direction. The first direction may be a direction perpendicular to the first surface 12-1, may be the direction parallel to the optical axis, or may be another direction. The second direction may be a direction perpendicular to the second surface 12-2, may be the direction parallel to the optical axis, or may be another direction. In the example of FIG. 1, the first drive unit 30-1 moves the movable body 10 in the first direction perpendicular to the first surface 12-1. In addition, the second drive unit 30-2 moves the movable body 10 in the second direction perpendicular to the second surface 12-2. The first direction and the second direction intersect each other. The first direction and the second direction may be any of an X axis direction, a Y axis direction, and a Z axis direction. In the example of FIG. 1, the first direction is the Y axis direction, and the second direction is the X axis direction.

The first drive unit 30-1 of the present example has a first magnet 32-1 and one or more first magnetic field generation units 34-1. In the example of FIG. 1, the first drive unit 30-1 has a first magnetic field generation unit 34-1a (referred to as a first coil) and a first magnetic field generation unit 34-1b (referred to as a second coil). One of the first magnet 32-1 and the first magnetic field generation unit 34-1 is provided on the first surface 12-1 of the movable body 10, and the other one of the first magnet 32-1 and the first magnetic field generation unit 34-1 is provided at a position facing the first surface 12-1. The camera module 100 has a fixed portion which includes surfaces facing one or more surfaces 12 of the movable body 10, but illustration thereof is omitted in FIG. 1. In the example of FIG. 1, the movable body 10 is provided with the first magnet 32-1, and the fixed portion is provided with the first magnetic field generation unit 34-1. In another example, the fixed portion may be provided with the first magnet 32-1, and the movable body 10 may be provided with the first magnetic field generation unit 34-1. The arrangement of the magnetic field generation unit 34 and the magnet 32 is similar to that in other drive units 30.

Each magnetic field generation unit 34 has, for example, a coil. Each coil winds in a plane parallel to the surface 12. That is, the magnetic field generation unit 34 generates a magnetic field perpendicular to the magnet 32. By reversing a direction of the current flowing through the coil, a direction of the magnetic field generated by the magnetic field generation unit 34 can be reversed.

The magnet 32 has a portion of a first polarity or a second polarity on a surface facing the magnetic field generation unit 34. The first polarity is one of a south pole and a north pole, and the second polarity is the other one of the south pole and the north pole. In each drawing, a portion of the second polarity in the magnet 32 is hatched, and a portion of the first polarity is not hatched.

When the magnetic field generation unit 34 generates the magnetic field, an attractive force or a repulsive force is generated, between the magnetic field generation unit 34, and a portion of a predetermined polarity in the magnet 32, according to the direction of the magnetic field generated by the magnetic field generation unit 34. In this way, the magnet 32 is fixed to the movable body 10, and the movable body 10 moves in any direction according to the attractive force or the repulsive force which is generated in the magnet 32.

The first magnet 32-1 has a first portion 41 and a second portion 42 on a surface facing the first magnetic field generation unit 34-1. The first portion 41 has the first polarity, and the second portion 42 has the second polarity. The first magnet 32 may have a second polarity portion 51 behind the first portion 41, and have a first polarity portion 52 behind the second portion 42. The expression as behind the portion of the magnet 32 refers to a surface, in each portion, on an opposite side of the surface facing the magnetic field generation unit 34.

The first magnetic field generation unit 34-1a is arranged to face the first portion 41 of the first magnet 32-1. The first magnetic field generation unit 34-1b is arranged to face the second portion 42 of the first magnet 32-1. The first magnetic field generation unit 34-1a and the first magnetic field generation unit 34-1b generate magnetic fields in directions opposite to each other. In this way, when the attractive force is generated between the first magnetic field generation unit 34-1a and the first portion 41, the attractive force is also generated between the first magnetic field generation unit 34-1b and the second portion 42, and when the repulsive force is generated between the first magnetic field generation unit 34-1a and the first portion 41, the repulsive force is also generated between the first magnetic field generation unit 34-1b and the second portion 42. This makes it possible to move the movable body 10 in the Y axis direction. A distance by which the movable body 10 is moved can be controlled by an intensity of the magnetic field generated by the magnetic field generation unit 34 (in the present example, an amount of currents flowing through the coil).

A part of the second drive unit 30-2 is provided on the second surface 12-2 of the movable body 10. The second surface 12-2 in the present example is a surface intersecting the first surface 12-1. The second surface 12-2 may be orthogonal to the first surface 12-1. The second drive unit 30-2 of the present example has a second magnet 32-2 provided on the second surface 12-2 of the movable body 10, and a second magnetic field generation unit 34-2.

The second magnet 32-2 has a first portion 61 on a surface facing the second magnetic field generation unit 34-2. The second magnet 32-2 has a second portion 62 behind the first portion 61. The first portion 61 has the first polarity or the second polarity, and the second portion 62 has a polarity opposite to that of the first portion 61.

The second magnetic field generation unit 34-2 is arranged to face the first portion 61 of the second magnet 32-2. The second magnetic field generation unit 34-2 generates a magnetic field perpendicular to the second magnet 32-2. The attractive force or the repulsive force is generated between the second magnet 32-2 and the second magnetic field generation unit 34-2, according to the direction of the magnetic field which is generated by the second magnetic field generation unit 34-2, and the movable body 10 moves in the second direction. In the example of FIG. 1, the second direction is a direction parallel to the X axis.

A position sensing unit 70 is provided at a position facing the first magnet 32-1. When the first magnet 32-1 is provided in the movable body 10, the position sensing unit 70 is provided in the fixed portion (refer to FIG. 2). When the first magnet 32-1 is provided in the fixed portion, the position sensing unit 70 is provided in the movable body 10.

The position sensing unit 70 is configured to detect a position in the first direction and a position in the second direction of the movable body 10. The position sensing unit 70 may have a magnetic sensor. Any magnetic sensor may be used as long as it can sense the direction and the intensity of the magnetic field. The magnetic sensor may be built in an IC chip provided with at least one of a processing circuit that processes a sensing result of the magnetic sensor, or a driver for driving a drive unit. The magnetic sensor may be provided separately from the IC chip. The IC chip may be formed on a silicon substrate, or may be formed on a semiconductor substrate of another material. The magnetic sensor may be a TMR element using a tunnel magnetoresistive effect, may be a GMR element using a giant magnetoresistive effect, may be a Hall element using a Hall effect, or may be a sensor of another type. The magnetic sensor may be made of a compound semiconductor, or may be made of another material. The position sensing unit 70 of the present example detects the magnetic field from the first magnet 32-1, and detects the position of the movable body 10, based on the detected magnetic field.

Figure 2:
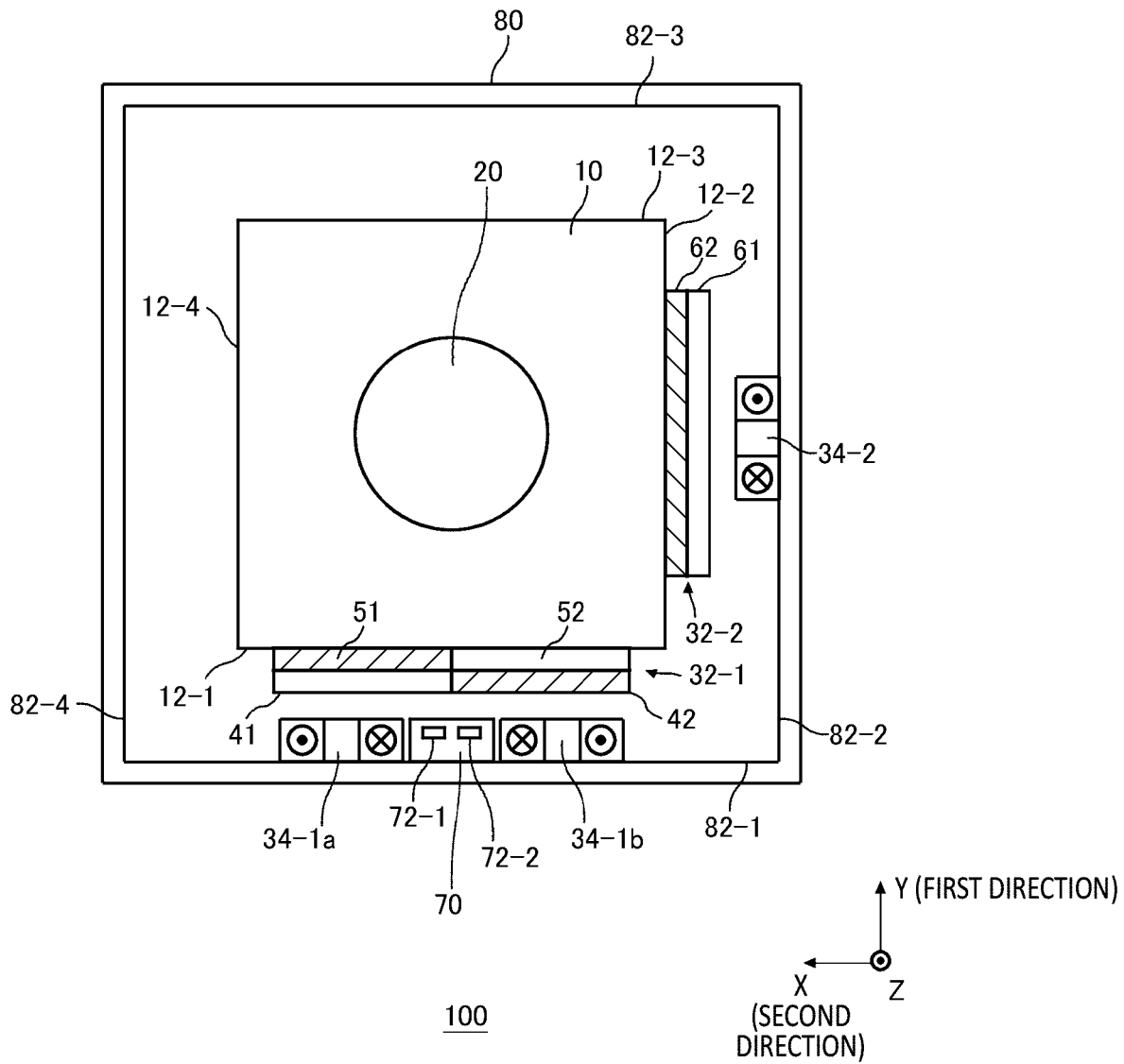
FIG. 2 is a plan view in which members of the camera module 100 shown in FIG. 1 are respectively projected onto an XY plane.

FIG. 2 is a plan view in which members of the camera module 100 shown in FIG. 1 are respectively projected onto an XY plane. In addition to the members shown in FIG. 1, the camera module 100 includes a fixed portion 80 having a surface facing the movable body 10. The fixed portion 80 has a surface facing the movable body 10 in a direction intersecting the optical axis of the optical element 20 (for example, the X axis direction or the Y axis direction). The fixed portion 80 of the present example has four surfaces 82 facing the four surfaces 12 of the movable body 10. A surface facing an nth surface 12-n is set as an nth surface 82-n. In the present example, n is an integer from 1 to 4. The fixed portion 80 may have a box shape that accommodates the movable body 10, may be a cylindrical shape that surrounds the movable body 10, or may have another shape. The fixed portion 80 is fixed to the device in which the camera module 100 is provided. The movable body 10 is provided to be able to move relative to the fixed portion 80.

The first magnet 32-1 of the present example is provided on the first surface 12-1 of the movable body 10. The first magnetic field generation units 34-1a, 34-1b are provided on a first surface 82-1 of the fixed portion 80. The first magnetic field generation units 34-1a, 34-1b are arranged for the currents to flow in directions opposite to each other. Therefore, the directions of the magnetic fields generated by the first magnetic field generation units 34-1a, 34-1b are directions opposite to each other. By the first magnetic field generation units 34-1a, 34-1b generating the magnetic fields, the movable body 10 moves in the first direction (the Y axis direction in the present example).

The second magnet 32-2 of the present example is provided on the second surface 12-2 of the movable body 10. The second magnetic field generation unit 34-2 is provided on a second surface 82-2 of the fixed portion 80. By the second magnetic field generation unit 34-2 generating the magnetic field, the movable body 10 moves in the second direction (the X axis direction in the present example).

The position sensing unit 70 has a first magnetic sensor 72-1 and a second magnetic sensor 72-2. The first magnetic sensor 72-1 is arranged to face the first portion 41 of the first magnet 32-1. The second magnetic sensor 72-2 is arranged to face the second portion 42 of the first magnet 32-1. It should be noted that in the present specification, when a position of each member is defined, unless otherwise specified, a position of each member in a state in which the movable body 10 exists at a predetermined origin position, is defined. The origin position in the Z axis direction is the center of a range in which the movable body 10 is able to move in the Z axis direction. Origin positions in the X axis direction and the Y axis direction are positions of the movable body 10 when the center (or the optical axis) of the optical element 20 overlaps the center of a light receiving surface of the image capturing unit below the optical element 20. The origin position may be a position of the movable body 10 in a state in which each magnetic field generation unit 34 does not generate the magnetic field and the camera module 100 is stationary.

Figure 3:
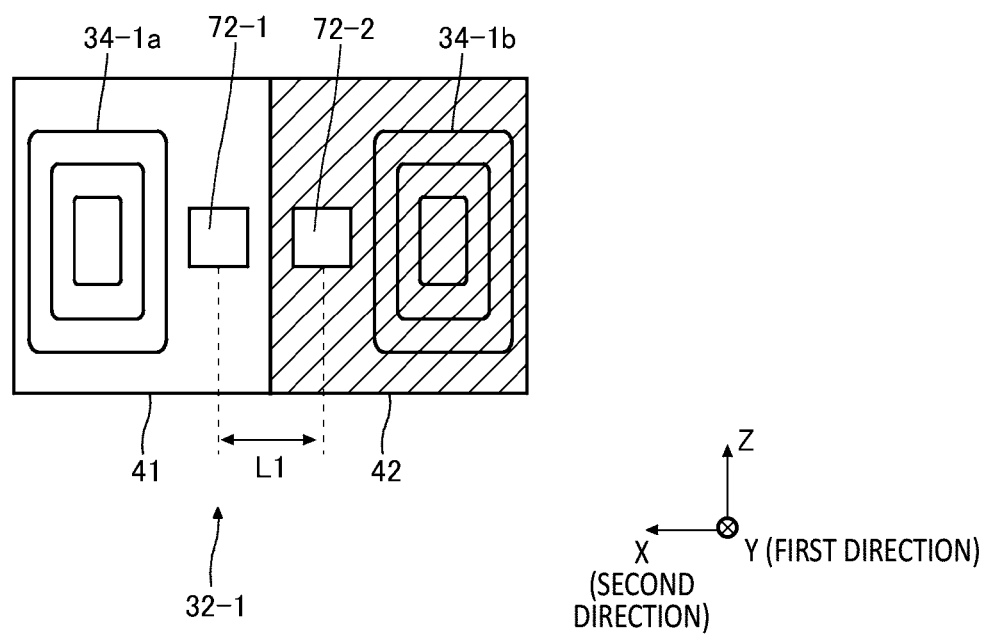
FIG. 3 is a diagram showing an arrangement example of a first magnet 32-1, a magnetic sensor 72, and a first magnetic field generation unit 34-1 on an XZ plane.

FIG. 3 is a diagram showing an arrangement example of a first magnet 32-1, a magnetic sensor 72, and a first magnetic field generation unit 34-1 on an XZ plane. The first magnet 32-1 has the first portion 41 and the second portion 42 on a surface facing the position sensing unit 70. The first portion 41 and the second portion 42 of the first magnet 32-1 are arranged to be aligned in the second direction (the X axis direction). It should be noted that the expression as two members are aligned means that positions of the two members are different in the direction. The two members may be arranged on a straight line parallel to the direction, or may be arranged to be deviated from the straight line. In addition, the two members may be in contact with each other, or may be separated from each other. The first portion 41 and the second portion 42 of the present example are in contact with each other. In another example, a neutral portion (a portion which is not magnetized) may be provided between the first polarity portion and the second polarity portion of the magnet. The positions and lengths of the first portion 41 and the second portion 42 in the Z axis direction may be the same. The lengths of the first portion 41 and the second portion 42 in the X axis direction may be the same.

The first magnetic field generation unit 34-1a and the first magnetic sensor 72-1 are arranged to face the first portion 41 of the first magnet 32-1. The first magnetic field generation unit 34-1b and the second magnetic sensor 72-2 are arranged to face the second portion 42 of the first magnet 32-1. The positions and the lengths of the first magnetic field generation unit 34-1a and the first magnetic field generation unit 34-1b may be the same in the Z axis direction. The lengths of the first magnetic field generation unit 34-1a and the first magnetic field generation unit 34-1b may be the same in the X axis direction. The first magnetic field generation unit 34-1a and the first magnetic field generation unit 34-1b may be arranged at positions symmetrical to each other with respect to a boundary line between the first portion 41 and the second portion 42.

The first magnetic sensor 72-1 and the second magnetic sensor 72-2 are arranged to be aligned in the second direction (the X axis direction). The first magnetic sensor 72-1 and the second magnetic sensor 72-2 may be arranged between the first magnetic field generation unit 34-1a and the second magnetic field generation unit 34-1b. This makes it possible to offset the magnetic field which is generated by the first magnetic field generation unit 34-1a, and the magnetic field which is generated by the second magnetic field generation unit 34-1b, and makes it possible for each magnetic sensor 72 to detect the magnetic field from the first magnet 32-1 with a high precision. The positions and the lengths of the first magnetic sensor 72-1 and the second magnetic sensor 72-2 may be the same in the Z axis direction. The lengths of the first magnetic sensor 72-1 and the second magnetic sensor 72-2 may be the same in the X axis direction. The first magnetic sensor 72-1 and the second magnetic sensor 72-2 may be arranged at positions symmetrical to each other with respect to the boundary line between the first portion 41 and the second portion 42. The magnetic field intensities detected by the first magnetic sensor 72-1 and the second magnetic sensor 72-2 change according to the position of the movable body 10 in the first direction (the Y axis direction), and further change according to the position of the movable body 10 in the second direction (the X axis direction). The directions of the magnetic sensitive axes of the first magnetic sensor 72-1 and the second magnetic sensor 72-2 may be the same, or may be opposite to each other. Directions of the magnetic sensitive axes of the first magnetic sensor 72-1 and the second magnetic sensor 72-2 are perpendicular to the first surface 12-1 (the Y axis direction). That is, the first magnetic sensor 72-1 and the second magnetic sensor 72-2 of the present example detect magnetic fields in the direction (the Y axis direction) perpendicular to the first surface 12-1.

A distance L1 in the second direction (the X axis direction) between the first magnetic sensor 72-1 and the second magnetic sensor 72-2 may be smaller than a distance by which the movable body 10 is able to move in the second direction. The distance L1 is a distance between the center of the first magnetic sensor 72-1 and the center of the second magnetic sensor 72-2. The center of the magnetic sensor 72 refers to the center of a magnetic sensitive surface. The distance by which the movable body 10 is able to move in the second direction refers to a maximum distance by which the movable body 10 can move in the second direction.

Figure 4:
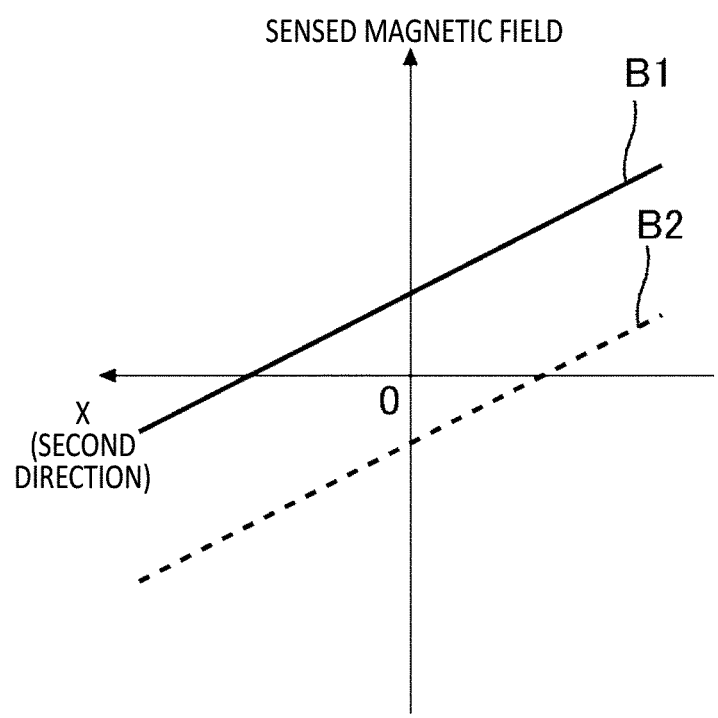
FIG. 4 is a diagram showing a relationship between a position of a movable body 10 in an X axis direction, and intensities of magnetic fields sensed by a first magnetic sensor 72-1 and a second magnetic sensor 72-2.

FIG. 4 is a diagram showing a relationship between a position of a movable body 10 in an X axis direction, and intensities of magnetic fields sensed by a first magnetic sensor 72-1 and a second magnetic sensor 72-2. In each drawing, the origin position of the movable body 10 described above is set as an origin 0. A first magnetic field intensity of the sensed magnetic field which is detected by the first magnetic sensor 72-1 is set as B1, and a second magnetic field intensity of the sensed magnetic field which is detected by the second magnetic sensor 72-2 is set as B2. In an initial state shown in FIG. 3, the first magnetic sensor 72-1 detects a large amount of magnetic fields from the first portion 41 to detect the positive magnetic field intensity B1. The second magnetic sensor 72-2 detects a large amount of magnetic fields from the second portion 42 to detect the negative magnetic field intensity B2.

When the movable body 10 moves in the X axis direction, a ratio of the magnetic field from the first portion 41, and the magnetic field from the second portion 42 which are detected by the respective magnetic sensors 72, changes. For example, when the movable body 10 moves to a positive side of the X axis from the state shown in FIG. 3, a distance between the first magnetic sensor 72-1 and the second portion 42 becomes small, and thus a magnetic field component that is from the first portion 41 and that is included in the magnetic field which is detected by the first magnetic sensor 72-1 decreases, and a magnetic field component from the second portion 42 increases. Therefore, as shown in FIG.

4, when the movable body 10 moves in a positive direction of the X axis, the first magnetic field intensity B1 of the first magnetic sensor 72-1 decreases linearly. Similarly, when the movable body 10 moves in the positive direction of the X axis, the second magnetic field intensity B2 of the second magnetic sensor 72-2 decreases linearly. In addition, when the movable body 10 moves to a negative side of the X axis, the distance between the first magnetic sensor 72-1 and the second portion 42 becomes large, and thus the magnetic field component that is from the first portion 41 and that is included in the magnetic field which is detected by the first magnetic sensor 72-1 increases, and the magnetic field component from the second portion 42 decreases. Therefore, as shown in FIG. 4, when the movable body 10 moves in a negative direction of the X axis, the first magnetic field intensity B1 of the first magnetic sensor 72-1 increases linearly. Similarly, when the movable body 10 moves in the negative direction of the X axis, the second magnetic field intensity B2 of the second magnetic sensor 72-2 increases linearly.

Figure 5:
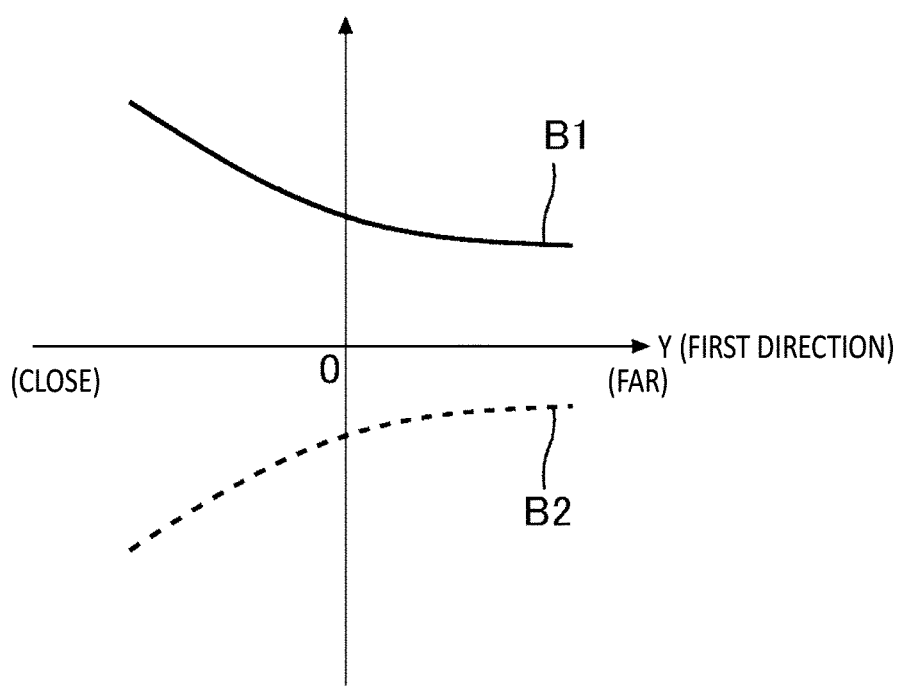
FIG. 5 is a diagram showing a relationship between a position of the movable body 10 in a Y axis direction, and the intensities of the magnetic fields sensed by the first magnetic sensor 72-1 and the second magnetic sensor 72-2.

FIG. 5 is a diagram showing a relationship between a position of the movable body 10 in a Y axis direction, and the intensities of the magnetic fields sensed by the first magnetic sensor 72-1 and the second magnetic sensor 72-2. In the initial state shown in FIG. 3, the first magnetic sensor 72-1 detects the positive first magnetic field intensity B1. The second magnetic sensor 72-2 detects the negative second magnetic field intensity B2. The magnetic sensitive axis of each magnetic sensor 72 is set to exhibit characteristics shown in FIG. 4 and FIG. 5.

When the movable body 10 moves in the Y axis direction, a distance between each magnetic sensor 72 and the first magnet 32-1 changes. In FIG. 5, a direction in which the distance between the magnetic sensor 72 and the first magnet 32-1 increases is set as a positive direction of the Y axis, and a direction in which the distance decreases is set as a negative direction of the Y axis. An absolute value of the magnetic field intensity which is sensed by each magnetic sensor 72 attenuates in proportion to a square to a cube of the distance from the first magnet 32-1.

The position sensing unit 70 detects the position of the movable body 10 in the first direction and the position of the movable body 10 in the second direction, based on the first magnetic field intensity B1 of the first magnetic sensor 72-1 and the second magnetic field intensity B2 of the second magnetic sensor 72-2. The position sensing unit 70 may calculate the position of the movable body 10 in the second direction (the X axis direction), based on at least one of the first magnetic field intensity B1 or the second magnetic field intensity B2. The position sensing unit 70 may calculate the position of the movable body 10 in the first direction, based on one of a sum of the first magnetic field intensity B1 and the second magnetic field intensity B2, and a difference between the first magnetic field intensity B1 and the second magnetic field intensity B2, and calculate the position of the movable body 10 in the second direction, based on the other one of the sum and the difference.

As shown in FIG. 4, as the movable body 10 moves in the positive direction of the X axis, B1+B2 decreases, and as the movable body 10 moves in the negative direction of the X axis, B1+B2 increases. The position sensing unit 70 may calculate the position of the movable body 10 in the X axis direction, based on the sum of the first magnetic field intensity B1 and the second magnetic field intensity B2. The position sensing unit 70 may calculate the position of the movable body 10 in the X axis direction, based on a value (B1+B2)/(B1−B2) obtained by dividing the sum of the first magnetic field intensity B1 and the second magnetic field intensity B2, by the difference between the first magnetic field intensity B1 and the second magnetic field intensity B2. The position sensing unit 70 may calculate the position of the movable body 10 in the Y axis direction, based on the difference between the first magnetic field intensity B1 and the second magnetic field intensity B2. As shown in FIG. 5, as the movable body 10 moves in the positive direction of the Y axis, B1−B2 becomes small, and as the movable body 10 moves in the negative direction of the Y axis, B1−B2 becomes large.

With the present example, it is possible for one position sensing unit 70 to sense the positions of the movable body 10 in two directions. Therefore, it is possible to reduce the number of components of the camera module 100, or to reduce a size of the camera module 100, in comparison with a case where the position sensing unit 70 is provided for each direction. In addition, the first magnet 32-1 included in the first drive unit 30-1 is also used as a magnet for sensing the position. Therefore, a separate magnet for sensing the position may not be provided, and it is possible to reduce the number of components of the camera module 100, or to reduce the size of the camera module 100.

Figure 6:
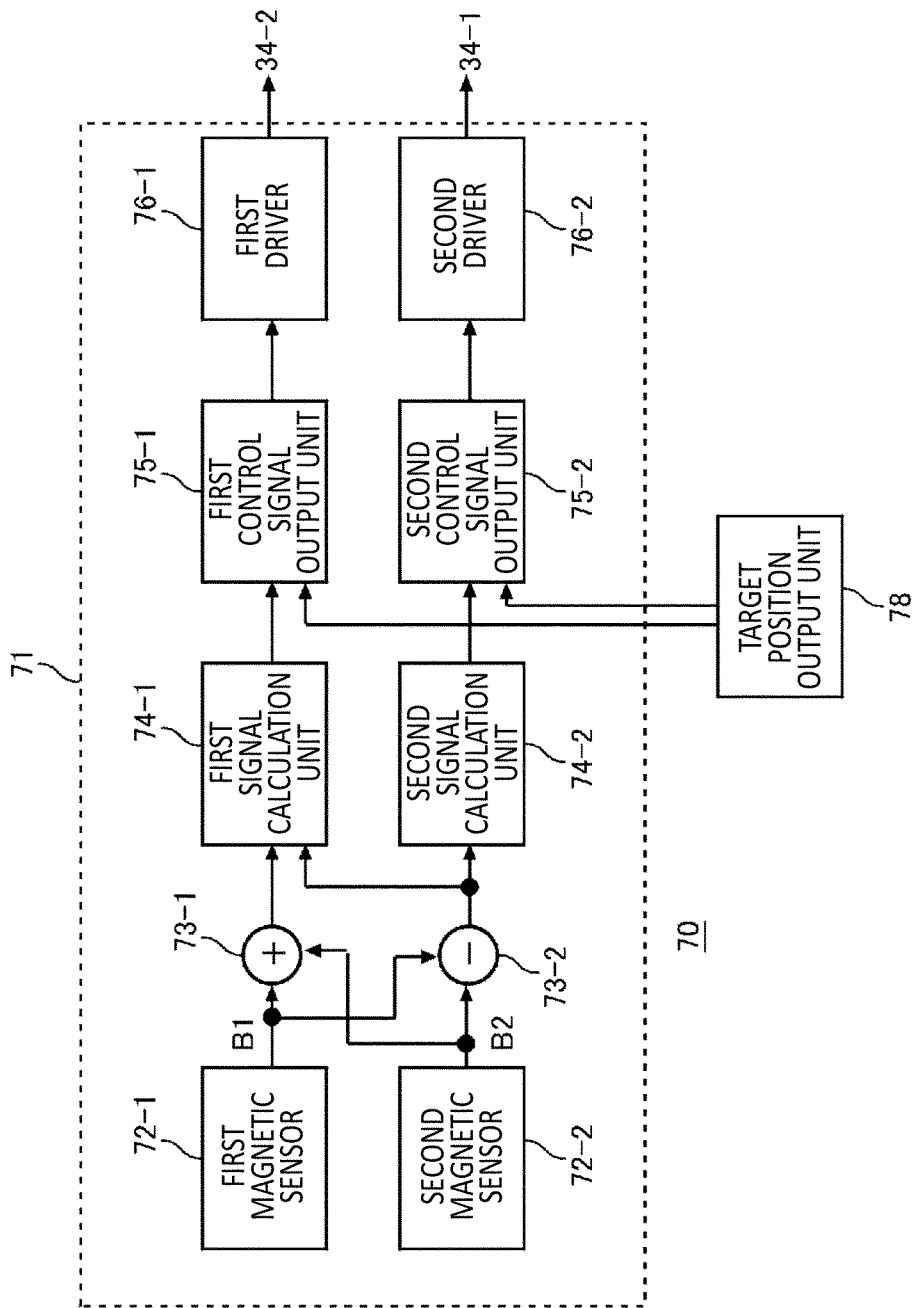
FIG. 6 is a diagram showing a configuration example of a position sensing unit 70.

FIG. 6 is a diagram showing a configuration example of a position sensing unit 70. The position sensing unit 70 of the present example has an IC chip 71. The IC chip 71 is provided with the first magnetic sensor 72-1, the second magnetic sensor 72-2, a first driver 76-1, and a second driver 76-2. The first driver 76-1 controls the magnetic fields which are generated by the first magnetic field generation unit 34-1 and the second magnetic field generation unit 34-2, based on the magnetic field intensity B1 and the magnetic field intensity B2 in the first magnetic sensor 72-1 and the second magnetic sensor 72-2. The IC chip 71 may be further provided with at least one of an addition circuit 73-1, a subtraction circuit 73-2, a first signal calculation unit 74-1, a second signal calculation unit 74-2, a first control signal output unit 75-1, or a second control signal output unit 75-2.

The first magnetic sensor 72-1 and the second magnetic sensor 72-2 output signals indicating magnitudes of the first magnetic field intensity B1 and the second magnetic field intensity B2. The first magnetic sensor 72-1 and the second magnetic sensor 72-2 may output digital signals, or may output analog signals.

The addition circuit 73-1 outputs a result obtained by adding the first magnetic field intensity B1 and the second magnetic field intensity B2. The subtraction circuit 73-2 outputs a result obtained by subtracting the second magnetic field intensity B2 from the first magnetic field intensity B1. The first signal calculation unit 74-1 calculates the position of the movable body 10 in the second direction, based on the addition result of the addition circuit 73-1. As described above, the first signal calculation unit 74-1 may calculate the position of the movable body 10 in the second direction, further based on the subtraction result of the subtraction circuit 73-2. The second signal calculation unit 74-2 calculates the position of the movable body 10 in the first direction, based on the subtraction result of the subtraction circuit 73-2.

The first control signal output unit 75-1 outputs a first control signal for adjusting the position of the movable body 10 in the second direction, based on the position of the movable body 10 in the second direction. The second control signal output unit 75-2 outputs a second control signal for adjusting the position of the movable body 10 in the first direction, based on the position of the movable body 10 in the first direction. For example, the first control signal and the second control signal are signals for controlling the position of the movable body 10 to a predetermined position such as the origin position.

The position sensing unit 70 may further have a target position output unit 78 that specifies the predetermined position. The target position output unit 78 may be built in the IC chip 71, or may be provided separately from the IC chip 71. The target position output unit 78 outputs target positions of the movable body 10 in the first direction and the second direction, to the first control signal output unit 75-1 and the second control signal output unit 75-2. For example, the target position in the Z axis direction is a position where the focal point of the optical element 20 is on a specific object. This makes it possible to realize an autofocus function. In addition, the target position in the X axis direction or the Y axis direction is a position where it is possible to suppress a vibration of the movable body 10. For example, the target position may be determined according to at least one of angular velocity or an acceleration of the movable body 10. This makes it possible to realize a camera shake correction function. The target position may be calculated by the target position output unit 78, based on a blur amount or a contrast in an image acquired by the image capturing unit, or the angular velocity or the acceleration of the movable body 10, or the like. The first control signal output unit 75-1 and the second control signal output unit 75-2 output the first control signal and the second control signal such that a difference between the position of the movable body 10 calculated by the first signal calculation unit 74-1 and the second signal calculation unit 74-2, and the target position which is output by the target position output unit 78, is small, or zero.

The first driver 76-1 drives the second magnetic field generation unit 34-2, based on the first control signal. The first driver 76-1 may cause a current which has a direction and a magnitude in accordance with the first control signal, to flow to the coil of the second magnetic field generation unit 34-2. The second driver 76-2 drives the first magnetic field generation unit 34-1, based on the second control signal. The second driver 76-2 may cause a current which has a direction and a magnitude in accordance with the second control signal, to flow to the coil of the first magnetic field generation unit 34-1.

With the present example, it is possible for one IC chip 71 to detect the positions of the movable body 10 in two directions, and to control the positions of the movable body 10 in the two directions. Therefore, it is possible to reduce the number of components of the camera module 100, or to reduce the size of the camera module 100. The IC chip 71 may be provided at the position of the position sensing unit 70 shown in FIG. 1 or the like.

Figure 7:
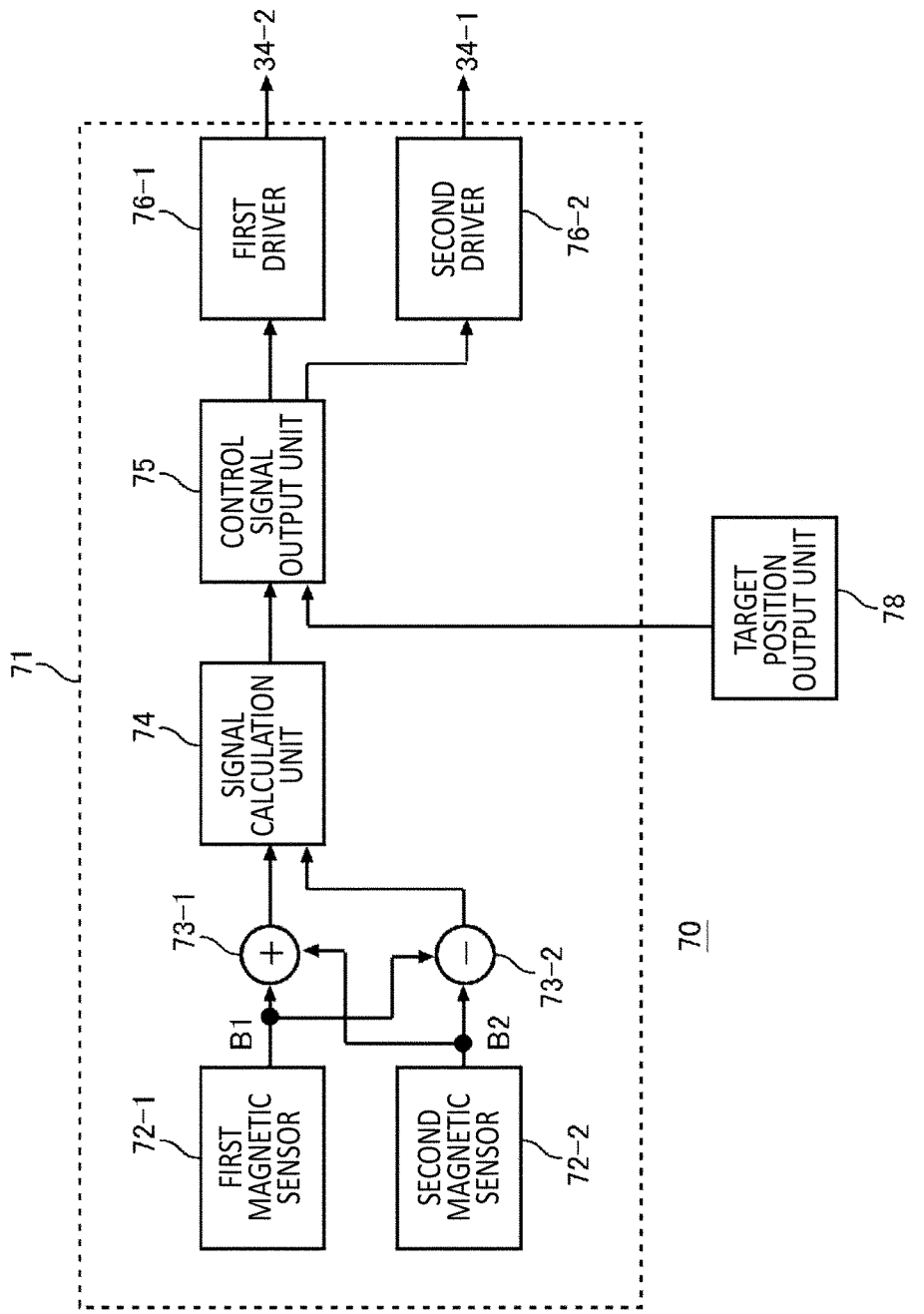
FIG. 7 is a diagram showing another configuration example of the position sensing unit 70.

FIG. 7 is a diagram showing another configuration example of the position sensing unit 70. The position sensing unit 70 of the present example is provided with one signal calculation unit 74 instead of the first signal calculation unit 74-1 and the second signal calculation unit 74-2. In addition, one control signal output unit 75 is provided instead of the first control signal output unit 75-1 and the second control signal output unit 75-2. Other structures are similar to those of the example shown in FIG. 6.

The signal calculation unit 74 functions in a time division manner as the first signal calculation unit 74-1 and the second signal calculation unit 74-2 shown in FIG. 6. That is, the signal calculation unit 74 switches, every predetermined time, between functioning as the first signal calculation unit 74-1, and functioning as the second signal calculation unit 74-2. The signal calculation unit 74 switches, every predetermined time, between calculating the position of the movable body 10 in the first direction, and calculating the position of the movable body 10 in the second direction.

The control signal output unit 75 functions in a time division manner as the first control signal output unit 75-1 and the second control signal output unit 75-2 shown in FIG. 6. That is, the control signal output unit 75 switches, every predetermined time, between functioning as the first control signal output unit 75-1 and functioning as the second control signal output unit 75-2. The control signal output unit 75 switches, every predetermined time, between outputting the first control signal and outputting the second control signal.

When the control signal output unit 75 newly outputs the first control signal, the first driver 76-1 drives the second magnetic field generation unit 34-2 according to the first control signal. The first driver 76-1 maintains a drive state of the second magnetic field generation unit 34-2 until the control signal output unit 75 outputs the next first control signal. That is, the first driver 76-1 maintains the drive state of the second magnetic field generation unit 34-2 while the control signal output unit 75 is outputting the second control signal.

When the control signal output unit 75 newly outputs the second control signal, the second driver 76-2 drives the first magnetic field generation unit 34-1 according to the second control signal. The second driver 76-2 maintains a drive state of the first magnetic field generation unit 34-1 until the control signal output unit 75 outputs the next second control signal. That is, the second driver 76-2 maintains the drive state of the first magnetic field generation unit 34-1 while the control signal output unit 75 is outputting the first control signal.

With the present example, it is possible to reduce the number of functional blocks which are included in the IC chip 71. Therefore, it is possible to reduce a size of the IC chip 71, and it is possible to reduce the size of the camera module 100.

Second Embodiment

Figure 8:
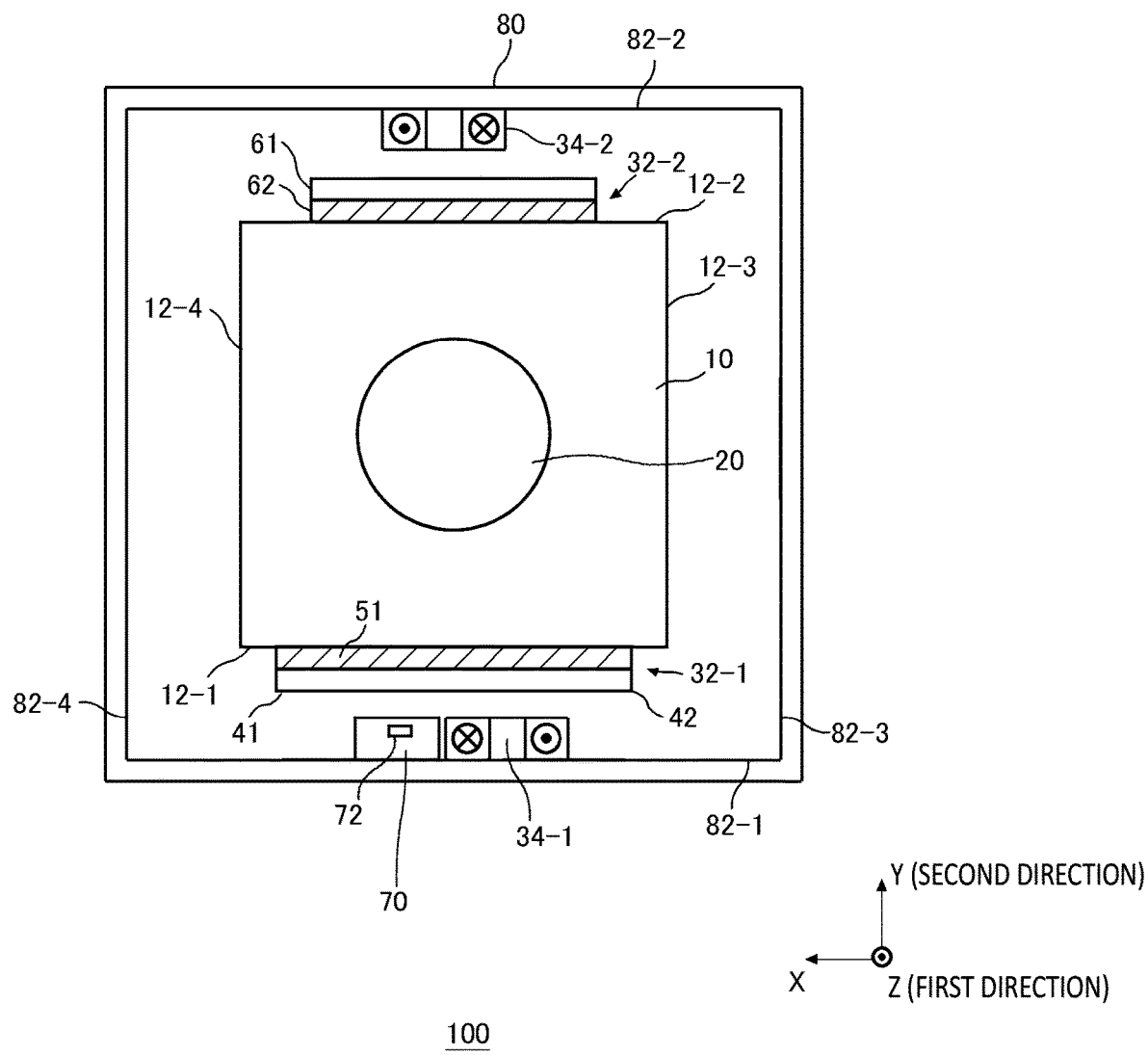
FIG. 8 is a plan view showing an example of the camera module 100 according to a second embodiment of the present invention.

FIG. 8 is a plan view showing an example of the camera module 100 according to a second embodiment of the present invention. In the present example, the movable body 10 moves in the Z axis direction (the first direction) parallel to the optical axis, and in the second direction intersecting the optical axis. The second direction in the present example is the Y axis direction intersecting an arrangement surface (or the first surface 12-1) on which the first portion 41 and the second portion 42 are arranged in the first magnet 32-1. In addition, in the present example, in the movable body 10, a surface on an opposite side of the first surface 12-1 is set as the second surface 12-2. Similarly, in the fixed portion 80, a surface on an opposite side of the first surface 82-1 is set as the second surface 82-2.

The second drive unit 30-2 of the present example has the second magnet 32-2 provided on the second surface 12-2, and the second magnetic field generation unit 34-2 provided on the second surface 82-2. The functions and the structures of the second magnet 32-2 and the second magnetic field generation unit 34-2 may be similar to those in the first embodiment. The second drive unit 30-2 of the present example moves the movable body 10 in the Y axis direction.

The first drive unit 30-1 of the present example has the first magnet 32-1 provided on the first surface 12-1, and the first magnetic field generation unit 34-1 provided on the first surface 82-1. The position sensing unit 70 of the present example is provided on the first surface 82-1. The first drive unit 30-1 of the present example moves the movable body 10 in the Z axis direction parallel to the optical axis.

Figure 9:
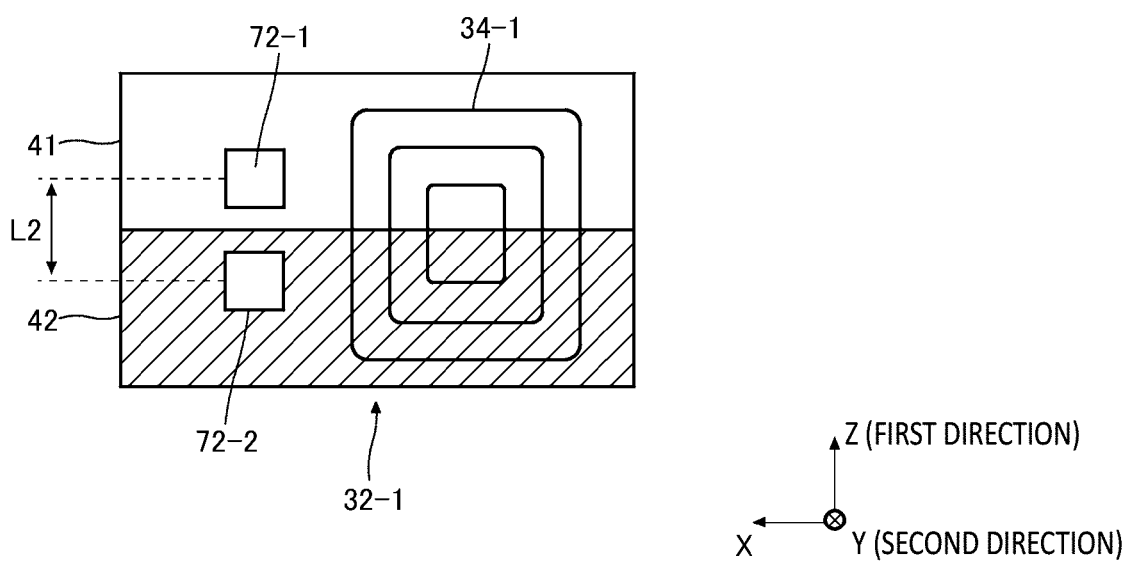
FIG. 9 is a diagram showing an arrangement example of the first magnet 32-1, the magnetic sensor 72, and the first magnetic field generation unit 34-1 on the XZ plane.

FIG. 9 is a diagram showing an arrangement example of the first magnet 32-1, the magnetic sensor 72, and the first magnetic field generation unit 34-1 on the XZ plane. The first magnet 32-1 of the present example has the first portion 41 and the second portion 42 aligned in the Z axis direction (the first direction) on the surface facing the position sensing unit 70. In the present specification, in the first magnet 32-1, the surface facing the position sensing unit 70 may be referred to as an arrangement surface. The positions and lengths of the first portion 41 and the second portion 42 in the X axis direction may be the same. The lengths of the first portion 41 and the second portion 42 in the Z axis direction may be the same.

The first magnetic field generation unit 34-1 of the present example is a third coil arranged to face the first portion 41 and the second portion 42 to straddle both of the first portion 41 and the second portion 42. The third coil may be arranged for a center axis of a winding to overlap the boundary line between the first portion 41 and the second portion 42, or may be arranged for the center axis to be deviated from the boundary line. The first magnetic field generation unit 34-1 generates a magnetic field in a direction perpendicular to the first magnet 32-1. By the direction of the magnetic field generated by the first magnetic field generation unit 34-1, it is possible to control whether to move the movable body 10 moves in a positive direction (upward) of the Z axis or to move in a negative direction (downward) of the Z axis. For example, when the magnetic field of the first magnetic field generation unit 34-1 is directed to attract the first portion 41, the movable body 10 moves in a direction (in the example of FIG. 9, the negative direction of the Z axis) in which the center of the first portion 41 of the first magnet 32-1 in the Z axis direction approaches the center of the first magnetic field generation unit 34-1 in the Z axis direction. When the magnetic field of the first magnetic field generation unit 34-1 is directed to attract the second portion 42, the movable body 10 moves in a direction (in the example of FIG. 9, the positive direction of the Z axis) in which the center of the second portion 42 of the first magnet 32-1 in the Z axis direction approaches the center of the first magnetic field generation unit 34-1 in the Z axis direction.

The first magnetic sensor 72-1 is arranged to face the first portion 41 of the first magnet 32-1. The second magnetic sensor 72-2 is arranged to face the second portion 42 of the first magnet 32-1. The first magnetic sensor 72-1 and the second magnetic sensor 72-2 are arranged to be aligned in the first direction (the Z axis direction). The positions and the lengths of the first magnetic sensor 72-1 and the second magnetic sensor 72-2 may be the same in the X axis direction. The lengths of the first magnetic sensor 72-1 and the second magnetic sensor 72-2 may be the same in the Z axis direction. The first magnetic sensor 72-1 and the second magnetic sensor 72-2 may be arranged at positions symmetrical to each other with respect to the boundary line between the first portion 41 and the second portion 42. A distance L2 between the first magnetic sensor 72-1 and the second magnetic sensor 72-2 in the Z axis direction may be smaller than a distance by which the movable body 10 is able to move in the Z axis direction. The distance L2 is a distance between the center of the first magnetic sensor 72-1 and the center of the second magnetic sensor 72-2. The magnetic field intensities detected by the first magnetic sensor 72-1 and the second magnetic sensor 72-2 change according to the position of the movable body 10 in the first direction (the Z axis direction), and further change according to the position of the movable body 10 in the second direction (the Y axis direction).

Figure 10:
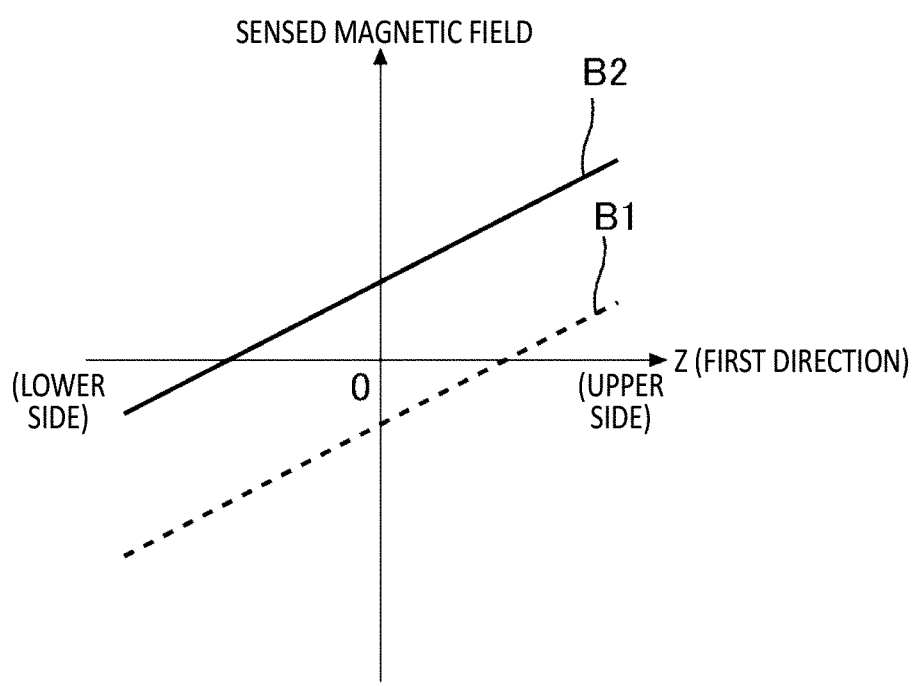
FIG. 10 is a diagram showing a relationship between a position of the movable body 10 in a Z axis direction, and the intensities of the magnetic fields sensed by the first magnetic sensor 72-1 and the second magnetic sensor 72-2.

FIG. 10 is a diagram showing a relationship between a position of the movable body 10 in a Z axis direction, and the intensities of the magnetic fields sensed by the first magnetic sensor 72-1 and the second magnetic sensor 72-2. In the present example, the positive direction of the Z axis is set as an upper side, and the negative direction of the Z axis is set as a lower side. Similarly to the example described in FIG. 4, when the movable body 10 moves in the positive direction of the Z axis, the first magnetic field intensity B1 of the first magnetic sensor 72-1 and the second magnetic field intensity B2 of the second magnetic sensor 72-2 increase linearly. In addition, when the movable body 10 moves in the negative direction of the Z axis, the first magnetic field intensity B1 of the first magnetic sensor 72-1 and the second magnetic field intensity B2 of the second magnetic sensor 72-2 decrease linearly.

Figure 11:
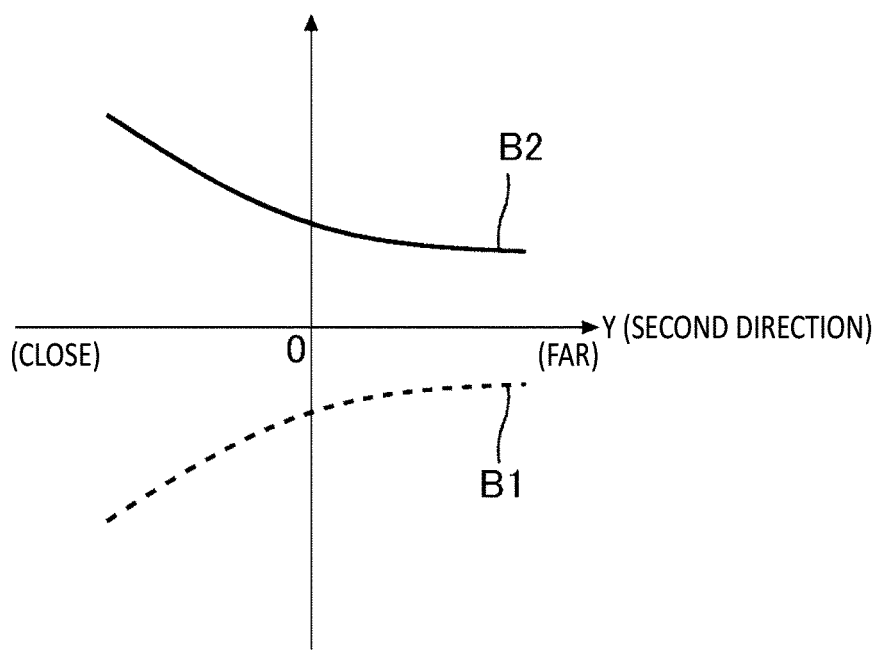
FIG. 11 is a diagram showing a relationship between the position of the movable body 10 in the Y axis direction, and the intensities of the magnetic fields sensed by the first magnetic sensor 72-1 and the second magnetic sensor 72-2.

FIG. 11 is a diagram showing a relationship between the position of the movable body 10 in the Y axis direction, and the intensities of the magnetic fields sensed by the first magnetic sensor 72-1 and the second magnetic sensor 72-2. Similarly to the example described in FIG. 5, when the movable body 10 moves in the positive direction of the Y axis, absolute values of the first magnetic field intensity B1 of the first magnetic sensor 72-1 and the second magnetic field intensity B2 of the second magnetic sensor 72-2 decrease. In addition, when the movable body 10 moves in the negative direction of the Y axis, the absolute values of the first magnetic field intensity B1 of the first magnetic sensor 72-1 and the second magnetic field intensity B2 of the second magnetic sensor 72-2 increase.

In the present example as well, the position sensing unit 70 may calculate the position of the movable body 10 in the Z axis direction, based on the sum of the first magnetic field intensity B1 and the second magnetic field intensity B2. The position sensing unit 70 may calculate the position of the movable body 10 in the Z axis direction, based on the value $(B1+B2)/(B1-B2)$ obtained by dividing the sum of the first magnetic field intensity B1 and the second magnetic field intensity B2, by the difference between the first magnetic field intensity B1 and the second magnetic field intensity B2. The position sensing unit 70 may calculate the position of the movable body 10 in the Y axis direction, based on the difference $(B1-B2)$ between the first magnetic field intensity B1 and the second magnetic field intensity B2.

Third Embodiment

Figure 12:
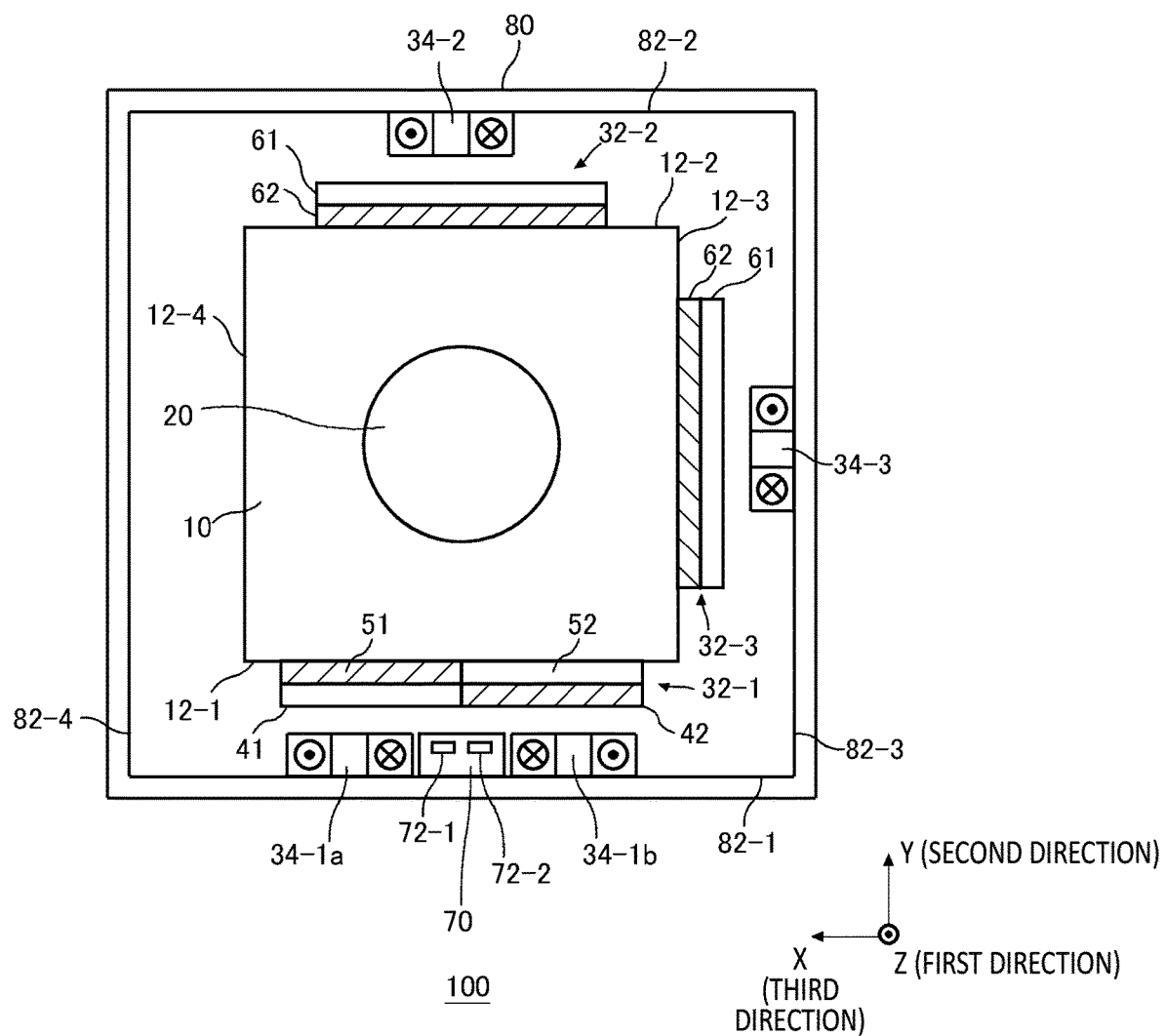
FIG. 12 is a plan view showing an example of the camera module 100 according to a third embodiment of the present invention.

FIG. 12 is a plan view showing an example of the camera module 100 according to a third embodiment of the present invention. In the present example, the movable body 10 moves in the first direction (the Z axis direction in FIG. 12) parallel to the optical axis, in the second direction (the Y axis direction in FIG. 12) intersecting the optical axis, and in a third direction (the X axis direction in FIG. 12) intersecting both of the first direction and the second direction. In addition, in the present example, in the movable body 10, a surface on the opposite side of the first surface 12-1 is set as the second surface 12-2, and a surface intersecting both of the first surface 12-1 and the second surface 12-2 is set as the third surface 12-3. Similarly, in the fixed portion 80, a surface on the opposite side of the first surface 82-1 is set as the second surface 82-2, and a surface intersecting both of the first surface 82-1 and the second surface 82-2 is set as a third surface 82-3.

The first drive unit 30-1 of the present example has the first magnet 32-1 provided on the first surface 12-1, and the first magnetic field generation unit 34-1 provided on the first surface 82-1. The position sensing unit 70 of the present example is provided on the first surface 82-1. The first drive unit 30-1 of the present example moves the movable body 10 in the Z axis direction parallel to the optical axis.

The second drive unit 30-2 of the present example has the second magnet 32-2 provided on the second surface 12-2, and the second magnetic field generation unit 34-2 provided on the second surface 82-2. The functions and the structures of the second magnet 32-2 and the second magnetic field generation unit 34-2 may be similar to those in the second embodiment. The second drive unit 30-2 of the present example moves the movable body 10 in the Y axis direction.

The third drive unit 30-3 (not shown in FIG. 1 or the like) of the present example has a third magnet 32-3 provided on the third surface 12-3, and a third magnetic field generation unit 34-3 provided on the third surface 82-3. The functions and the structures of the third magnet 32-3 and the third magnetic field generation unit 34-3 are similar to those of the second magnet 32-2 and the second magnetic field generation unit 34-2 of the first embodiment. The third drive unit 30-3 of the present example moves the movable body 10 in the X axis direction.

Figure 13:
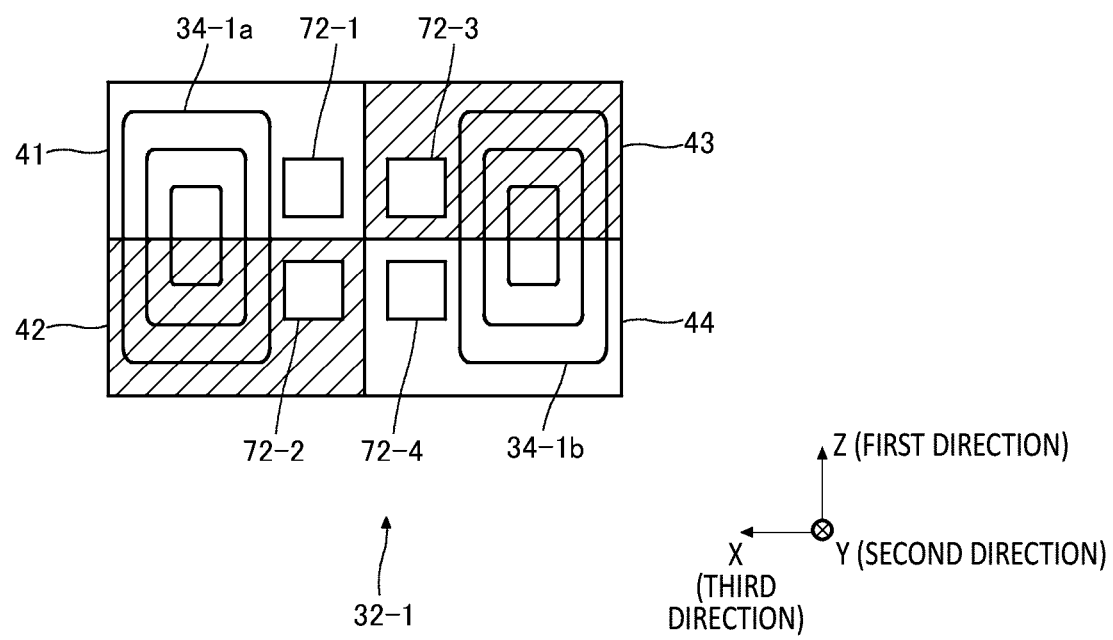
FIG. 13 is a diagram showing an arrangement example of the first magnet 32-1, the magnetic sensor 72, and the first magnetic field generation unit 34-1 on the XZ plane.

FIG. 13 is a diagram showing an arrangement example of the first magnet 32-1, the magnetic sensor 72, and the first magnetic field generation unit 34-1 on the XZ plane. The first magnet 32-1 of the present example has the first portion 41 and the second portion 42 aligned in the Z axis direction (the first direction) on the surface (that is, the arrangement surface) facing the position sensing unit 70. The first portion 41 and the second portion 42 may be similar to the first portion 41 and the second portion 42 in the second embodiment.

The first magnet 32-1 further has a third portion 43 and a fourth portion 44 on the arrangement surface. The third portion 43 is a portion that has the second polarity and that is arranged to be aligned with the first portion 41 in the third direction (the X axis direction). The fourth portion 44 is a portion that has the first polarity and that is arranged to be aligned with the second portion 42 in the third direction (the X axis direction). The fourth portion 44 is arranged to be aligned with the third portion 43 in the first direction (the Z axis direction). The positions and lengths of the third portion 43 and the fourth portion 44 in the X axis direction may be the same. The lengths of the third portion 43 and the fourth portion 44 in the Z axis direction may be the same. The first portion 41, the second portion 42, the third portion 43, and the fourth portion 44 may be quartered portions of the first magnet 32-1. Behind each of the first portion 41, the second portion 42, the third portion 43, and the fourth portion 44, a portion of the opposite polarity may be arranged.

In the present example, at least one of the first magnetic field generation unit 34-1a or the second magnetic field generation unit 34-1b is provided to face the first magnet 32-1. The first magnetic field generation unit 34-1a is a coil arranged to face the first portion 41 and the second portion 42 to straddle both of the first portion 41 and the second portion 42, similarly to the first magnetic field generation unit 34-1 of the second embodiment. The first magnetic field generation unit 34-1b is a coil arranged to face the third portion 43 and the fourth portion 44 to straddle both of the third portion 43 and the fourth portion 44, similarly to the first magnetic field generation unit 34-1 of the second embodiment. The first magnetic field generation unit 34-1a and the first magnetic field generation unit 34-1b generate magnetic fields in directions opposite to each other. In this way, when the first magnetic field generation unit 34-1a is generating a magnetic field which moves the first portion 41 and the second portion 42 to the upper side (or the lower side), the first magnetic field generation unit 34-1b also generates a magnetic field which moves the third portion 43 and the fourth portion 44 to the upper side (or the lower side).

The position sensing unit 70 has the first magnetic sensor 72-1 and the second magnetic sensor 72-2. The arrangement of the first magnetic sensor 72-1 and the second magnetic sensor 72-2 is similar to that in the first embodiment.

The position sensing unit 70 of the present example further has at least one of a third magnetic sensor 72-3 or a fourth magnetic sensor 72-4. The third magnetic sensor 72-3 is arranged to face the third portion 43. The fourth magnetic sensor 72-4 is arranged to face the fourth portion 44. The third magnetic sensor 72-3 and the fourth magnetic sensor 72-4 are arranged to be aligned in the first direction (the Z axis direction). The first magnetic sensor 72-1 and the third magnetic sensor 72-3 are arranged to be aligned in the third direction (the X axis direction). The second magnetic sensor 72-2 and the fourth magnetic sensor 72-4 are arranged to be aligned in the third direction (the X axis direction). The first magnetic sensor 72-1 and the second magnetic sensor 72-2 may be arranged at positions symmetrical to each other with respect to the boundary line between the first portion 41 and the second portion 42. The third magnetic sensor 72-3 and the fourth magnetic sensor 72-4 may be arranged at positions symmetrical to each other with respect to a boundary line between the third portion 43 and the fourth portion 44. The first magnetic sensor 72-1 and the third magnetic sensor 72-3 may be arranged at positions symmetrical to each other with respect to a boundary line between the first portion 41 and the third portion 43. The second magnetic sensor 72-2 and the fourth magnetic sensor 72-4 may be arranged at positions symmetrical to each other with respect to a boundary line between the second portion 42 and the fourth portion 44.

Each magnetic sensor 72 may be arranged between the first magnetic field generation unit 34-1a and the second magnetic field generation unit 34-1b in the X axis direction. This makes it possible to offset the magnetic fields which are generated by the first magnetic field generation unit 34-1a and the second magnetic field generation unit 34-1b, and makes it possible for each magnetic sensor 72 to detect the magnetic field from the first magnet 32-1 with a high precision.

Figure 14:
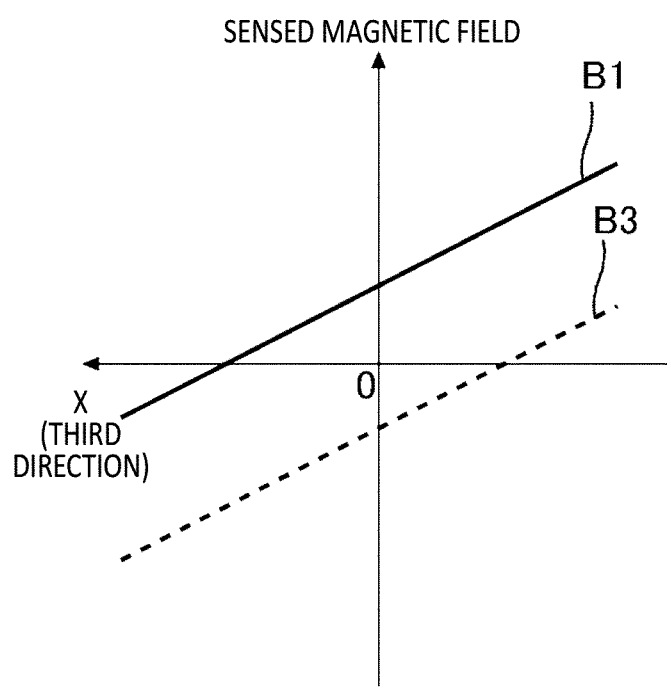
FIG. 14 is a diagram showing a relationship between the position of the movable body 10 in the X axis direction, and the intensities of the magnetic fields sensed by the first magnetic sensor 72-1 and a third magnetic sensor 72-3.

FIG. 14 is a diagram showing a relationship between the position of the movable body 10 in the X axis direction, and the intensities of the magnetic fields sensed by the first magnetic sensor 72-1 and a third magnetic sensor 72-3. It should be noted that the intensities of the magnetic fields sensed by the second magnetic sensor 72-2 and the fourth magnetic sensor 72-4 are also similar to those sensed by the first magnetic sensor 72-1 and the third magnetic sensor 72-3. Similarly to the example described in FIG. 4, when the movable body 10 moves in the positive direction of the X axis, the first magnetic field intensity B1 of the first magnetic sensor 72-1 and the third magnetic field intensity B3 of the third magnetic sensor 72-3 decrease linearly. In addition, when the movable body 10 moves in the negative direction of the X axis, the first magnetic field intensity B1 of the first magnetic sensor 72-1 and the third magnetic field intensity B3 of the third magnetic sensor 72-3 increase linearly.

Figure 15:
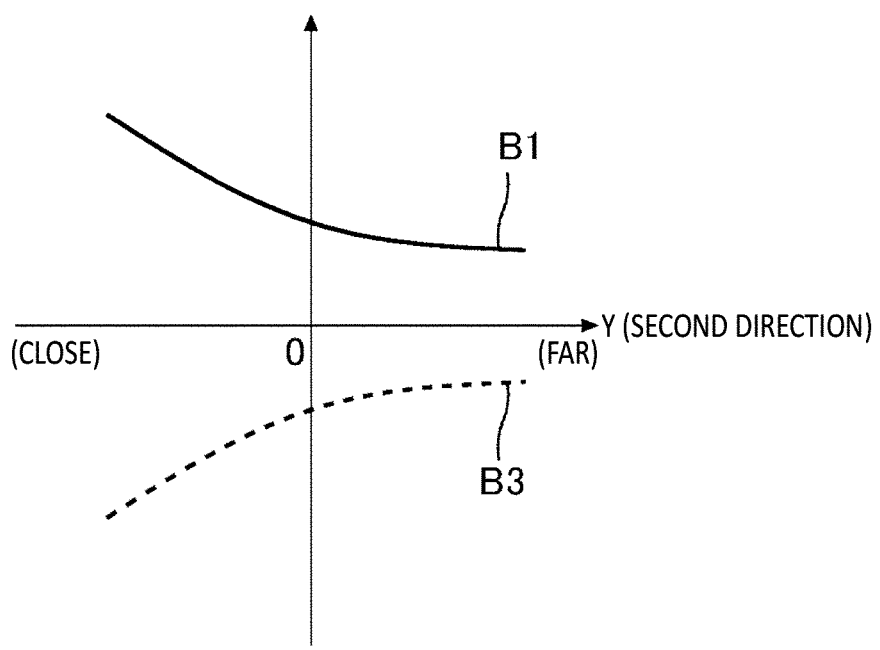
FIG. 15 is a diagram showing a relationship between the position of the movable body 10 in the Y axis direction, and the intensities of the magnetic fields sensed by the first magnetic sensor 72-1 and the third magnetic sensor 72-3.

FIG. 15 is a diagram showing a relationship between the position of the movable body 10 in the Y axis direction, and the intensities of the magnetic fields sensed by the first magnetic sensor 72-1 and the third magnetic sensor 72-3. It should be noted that the intensities of the magnetic fields sensed by the second magnetic sensor 72-2 and the fourth magnetic sensor 72-4 are also similar to those sensed by the first magnetic sensor 72-1 and the third magnetic sensor 72-3. Similarly to the example described in FIG. 11, when the movable body 10 moves in the positive direction of the Y axis, absolute values of the first magnetic field intensity B1 of the first magnetic sensor 72-1 and the third magnetic field intensity B3 of the third magnetic sensor 72-3 decrease. In addition, when the movable body 10 moves in the negative direction of the Y axis, the absolute values of the first magnetic field intensity B1 of the first magnetic sensor 72-1 and the third magnetic field intensity B3 of the third magnetic sensor 72-3 increase.

Figure 16:
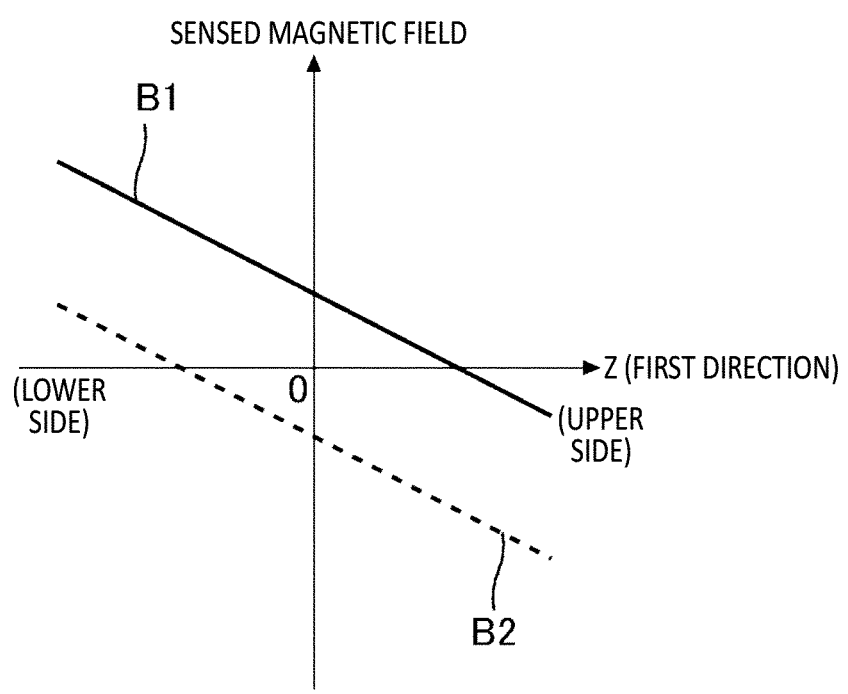
FIG. 16 is a diagram showing a relationship between the position of the movable body 10 in the Z axis direction, and the intensities of the magnetic fields sensed by the first magnetic sensor 72-1 and the second magnetic sensor 72-2.

FIG. 16 is a diagram showing a relationship between the position of the movable body 10 in the Z axis direction, and the intensities of the magnetic fields sensed by the first magnetic sensor 72-1 and the second magnetic sensor 72-2. It should be noted that the intensities of the magnetic fields sensed by the third magnetic sensor 72-3 and the fourth magnetic sensor 72-4 are also similar to those sensed by the first magnetic sensor 72-1 and the second magnetic sensor 72-2. Similarly to the movement in the X axis direction, when the movable body 10 moves in the positive direction of the Z axis, the first magnetic field intensity B1 of the first magnetic sensor 72-1 and the second magnetic field intensity B2 of the second magnetic sensor 72-2 decrease. In addition, when the movable body 10 moves in the negative direction of the Z axis, the first magnetic field intensity B1 of the first magnetic sensor 72-1 and the second magnetic field intensity B2 of the second magnetic sensor 72-2 increase.

Similarly to the first embodiment, the position sensing unit 70 calculates the position of the movable body 10 in the X axis direction, based on the sum of the magnetic field intensities which are sensed by the two magnetic sensors 72 arranged adjacent to each other in the X axis direction. The position sensing unit 70 may calculate the position in the X axis direction, based on at least one of a sum (B1+B3) of the first magnetic field intensity B1 and the third magnetic field intensity B3, or a sum (B2+B4) of the second magnetic field intensity B2 and a fourth magnetic field intensity B4. In addition, the position sensing unit 70 may calculate the position in the X axis direction, based on a ratio (B1+B3)/(B1−B3) of the sum and a difference of the first magnetic field intensity B1 and the third magnetic field intensity B3, or may calculate the position in the X axis direction, based on a ratio (B2+B4)/(B2−B4) of the sum and a difference of the second magnetic field intensity B2 and the fourth magnetic field intensity B4. The position sensing unit 70 may use an average value of positions in the X axis direction calculated by two or more methods.

Similarly to the first embodiment, the position sensing unit 70 calculates the position of the movable body 10 in the Y axis direction, based on the difference between the magnetic field intensities which are sensed by the two magnetic sensors 72 arranged adjacent to each other in the X axis direction or the Z axis direction. The position sensing unit 70 may calculate the position of the movable body 10 in the Y axis direction, based on the difference (B1−B2) between the first magnetic field intensity B1 and the second magnetic field intensity B2. The position sensing unit 70 may calculate the position of the movable body 10 in the Y axis direction, based on the difference (B1−B3) between the first magnetic field intensity B1 and the third magnetic field intensity B3, may calculate the position of the movable body 10 in the Y axis direction, based on the difference (B2−B4) between the second magnetic field intensity B2 and the fourth magnetic field intensity B4 of the fourth magnetic sensor 72-4, or may calculate the position of the movable body 10 in the Y axis direction, based on a difference (B3−B4) between the third magnetic field intensity B3 and the fourth magnetic field intensity B4. The position sensing unit 70 may use an average value of positions in the Y axis direction calculated by two or more methods.

Similarly to the second embodiment, the position sensing unit 70 calculates the position of the movable body 10 in the Z axis direction, based on the sum of the magnetic field intensities which are sensed by the two magnetic sensors 72 arranged adjacent to each other in the Z axis direction. The position sensing unit 70 may calculate the position in the Z axis direction, based on the sum (B1+B2) of the first magnetic field intensity B1 and the second magnetic field intensity B2, or may calculate the position in the Z axis direction, based on a sum (B3+B4) of the third magnetic field intensity B3 and the fourth magnetic field intensity B4. In addition, the position sensing unit 70 may calculate the position in the Z axis direction, based on the ratio (B1+B2)/(B1−B2) of the sum and the difference of the first magnetic field intensity B1 and the second magnetic field intensity B2, or may calculate the position in the Z axis direction, based on a ratio (B3+B4)/(B3−B4) of the sum and the difference of the third magnetic field intensity B3 and the fourth magnetic field intensity B4. The position sensing unit 70 may use an average value of positions in the Z axis direction calculated by two or more methods.

Figure 17:
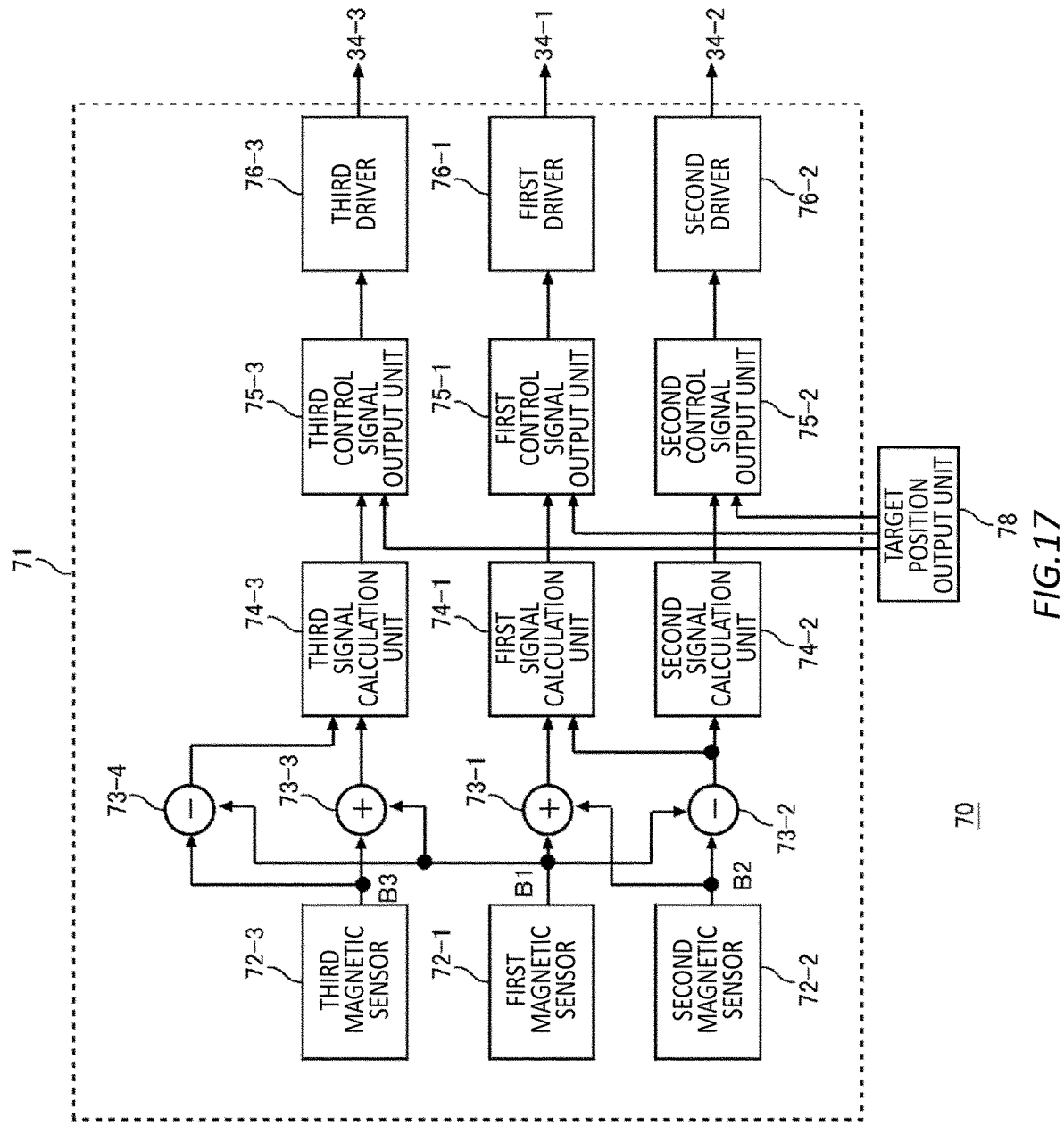
FIG. 17 is a diagram showing another configuration example of an IC chip 71.

FIG. 17 is a diagram showing another configuration example of an IC chip 71. In addition to the configuration of the IC chip 71 described with reference to FIG. 6, the IC chip 71 of the present example further includes the third magnetic sensor 72-3, an addition circuit 73-3, a third signal calculation unit 74-3, a third control signal output unit 75-3, and a third driver 76-3. The addition circuit 73-3 calculates the sum (B1+B3) of the first magnetic field intensity B1 and the third magnetic field intensity B3.

The first signal calculation unit 74-1 calculates the position of the movable body 10 in the first direction (the Z axis direction), based on the addition result of the addition circuit 73-1. As described above, the first signal calculation unit 74-1 may calculate the position of the movable body 10 in the first direction, further based on the subtraction result of the subtraction circuit 73-2. The second signal calculation unit 74-2 calculates the position of the movable body 10 in the second direction (the Y axis direction), based on the subtraction result of the subtraction circuit 73-2. The third signal calculation unit 74-3 calculates a position of the movable body 10 in the third direction (the X axis direction), based on an addition result of the addition circuit 73-3. As described above, the third signal calculation unit 74-3 may calculate the position of the movable body 10 in the third direction, further based on the difference (B1−B3) between the first magnetic field intensity B1 and the third magnetic field intensity B3. The IC chip 71 may further include a subtraction circuit 73-4 that calculates the difference (B1−B3) between the first magnetic field intensity B1 and the third magnetic field intensity B3.

The first control signal output unit 75-1 outputs a first control signal for adjusting the position of the movable body 10 in the first direction, based on the position of the movable body 10 in the first direction. The second control signal output unit 75-2 outputs a second control signal for adjusting the position of the movable body 10 in the second direction, based on the position of the movable body 10 in the second direction. The third control signal output unit 75-3 outputs a third control signal for adjusting the position of the movable body 10 in the third direction, based on the position of the movable body 10 in the third direction.

The first driver 76-1 drives the first magnetic field generation unit 34-1, based on the first control signal. The second driver 76-2 drives the second magnetic field generation unit 34-2, based on the second control signal. The third driver 76-3 drives the third magnetic field generation unit 34-3 based on the third control signal.

Similarly to the example shown in FIG. 7, one signal calculation unit 74 may be operated in a time division manner as the first signal calculation unit 74-1 to the third signal calculation unit 74-3. In addition, one control signal output unit 75 may be operated in a time division manner as the first control signal output unit 75-1 to the third control signal output unit 75-3.

Fourth Embodiment

Figure 18:
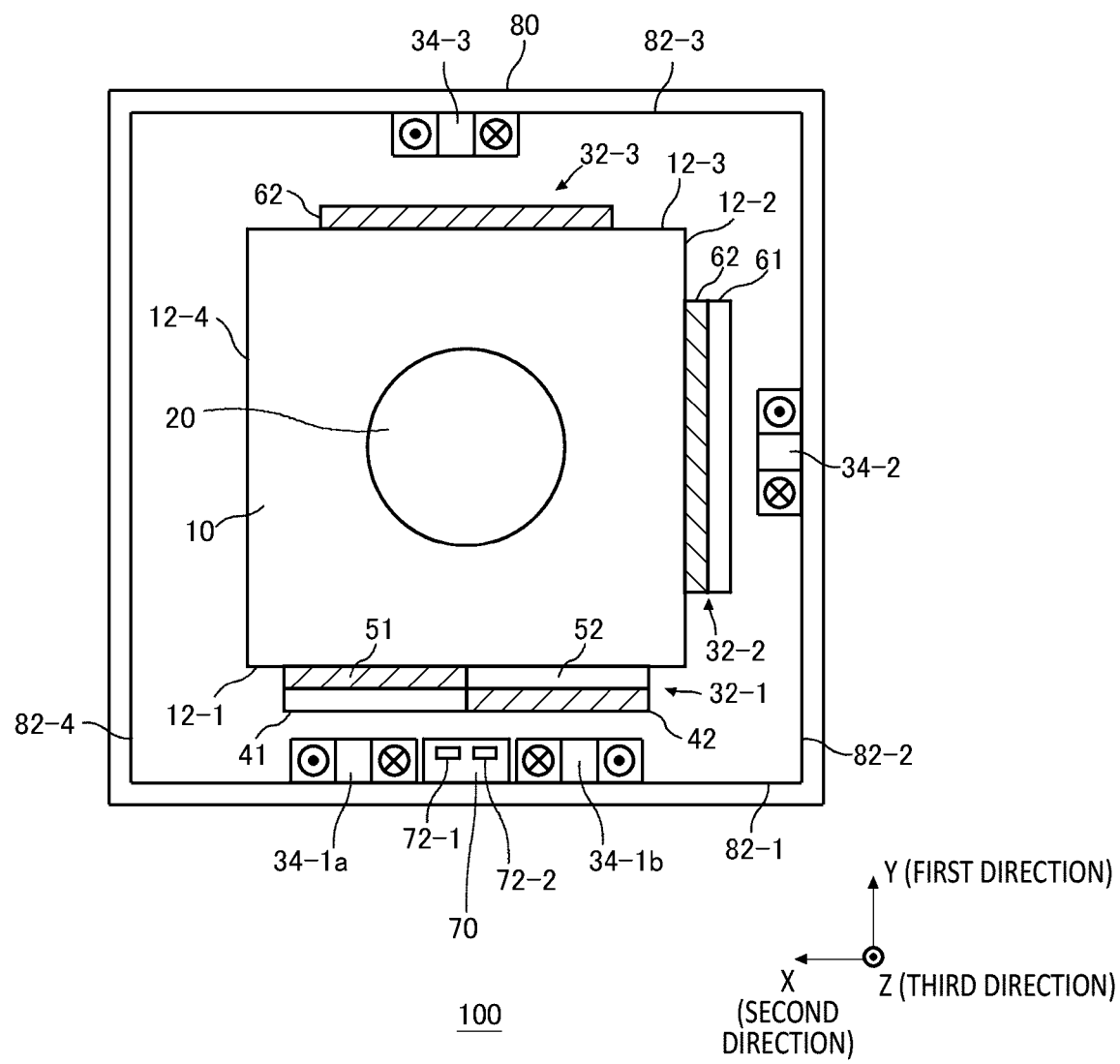
FIG. 18 is a plan view showing an example of the camera module 100 according to a fourth embodiment of the present invention.

FIG. 18 is a plan view showing an example of the camera module 100 according to a fourth embodiment of the present invention. In the present example, the movable body 10 moves in the first direction (the Y axis direction in FIG. 18) intersecting the optical axis, and in the second direction (the X axis direction in FIG. 18) intersecting both of the optical axis and the first direction, and in the third direction (the Z axis direction in FIG. 18) parallel to the optical axis. In addition, in the present example, in the movable body 10, a surface on the opposite side of the first surface 12-1 is set as the third surface 12-3, and a surface intersecting both of the first surface 12-1 and the third surface 12-3 is set as the second surface 12-2. Similarly, in the fixed portion 80, a surface on the opposite side of the first surface 82-1 is set as the third surface 82-3, and a surface intersecting both of the first surface 82-1 and the third surface 82-3 is set as the second surface 82-2.

The first drive unit 30-1 of the present example has the first magnet 32-1 provided on the first surface 12-1, and the first magnetic field generation unit 34-1 provided on the first surface 82-1. The position sensing unit 70 of the present example is provided on the first surface 82-1. The first drive unit 30-1 of the present example moves the movable body 10 in the first direction (the Y axis direction in FIG. 18).

The second drive unit 30-2 of the present example has the second magnet 32-2 provided on the second surface 12-2, and the second magnetic field generation unit 34-2 provided on the second surface 82-2. The functions and the structures of the second magnet 32-2 and the second magnetic field generation unit 34-2 may be similar to those in the first embodiment. The second drive unit 30-2 of the present example moves the movable body 10 in the second direction (the X axis direction in FIG. 18).

The third drive unit 30-3 of the present example has the third magnet 32-3 provided on the third surface 12-3, and the third magnetic field generation unit 34-3 provided on the third surface 82-3. The third drive unit 30-3 of the present example moves the movable body 10 in the third direction (the Z axis direction in FIG. 18).

Figure 19:
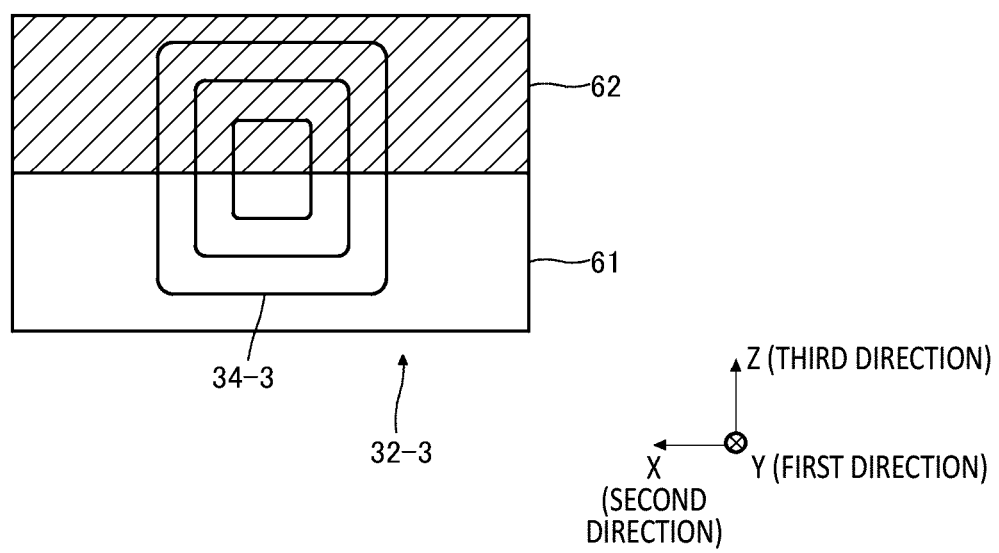
FIG. 19 is a diagram showing an arrangement example of a third magnet 32-3 and a third magnetic field generation unit 34-3 on the XZ plane.

FIG. 19 is a diagram showing an arrangement example of a third magnet 32-3 and a third magnetic field generation unit 34-3 on the XZ plane. The third magnet 32-3 of the present example has a first portion 61 and a second portion 62 aligned in the Z axis direction on the XZ plane. The first portion 61 and the second portion 62 have polarities different from each other.

Similarly to the first magnetic field generation unit 34-1 of the second embodiment, the third magnetic field generation unit 34-3 is a coil arranged to face the first portion 61 and the second portion 62 to straddle both of the first portion 61 and the second portion 62. By the third magnetic field generation unit 34-3 generating the magnetic field, a driving force is generated to move the third magnet 32-3 in the Z axis direction.

Figure 20:
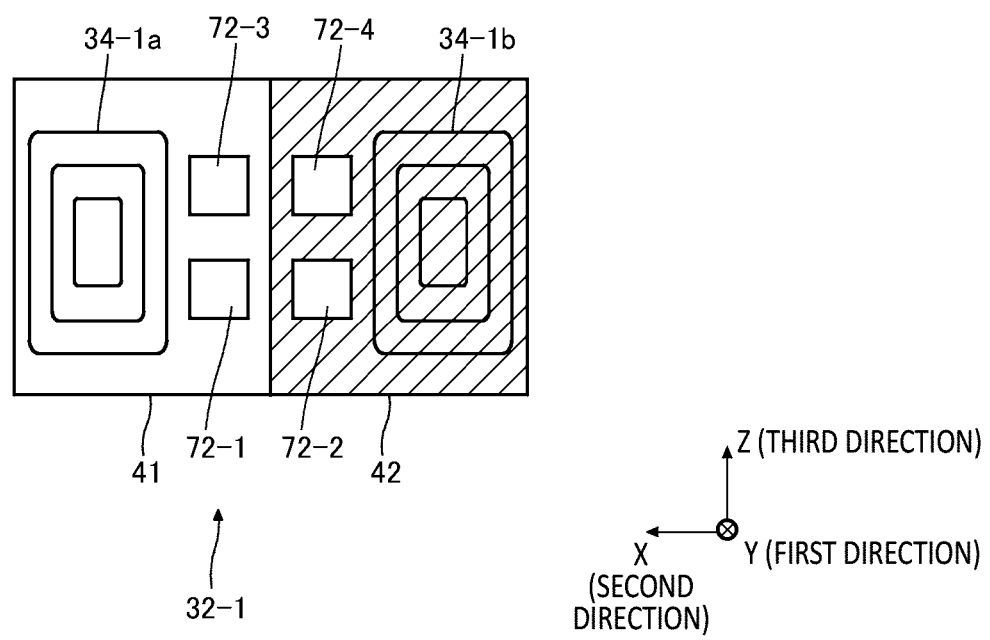
FIG. 20 is a diagram showing an arrangement example of the first magnet 32-1, the magnetic sensor 72, and the first magnetic field generation unit 34-1 on the XZ plane.

FIG. 20 is a diagram showing an arrangement example of the first magnet 32-1, the magnetic sensor 72, and the first magnetic field generation unit 34-1 on the XZ plane. The first magnet 32-1 of the present example has the first portion 41 and the second portion 42 aligned in the X axis direction (the first direction) on the surface (that is, the arrangement surface) facing the position sensing unit 70. The first portion 41 and the second portion 42 may be similar to the first portion 41 and the second portion 42 in the first embodiment. Behind each of the first portion 41 and the second portion 42, a portion of the opposite polarity may be arranged.

In the present example, at least one of the first magnetic field generation unit 34-1a or the second magnetic field generation unit 34-1b is provided to face the first magnet 32-1. The arrangement of the first magnetic field generation unit 34-1a and the second magnetic field generation unit 34-1b is similar to that of the first magnetic field generation unit 34-1a and the second magnetic field generation unit 34-1b of the first embodiment. By at least one of the first magnetic field generation unit 34-1a or the second magnetic field generation unit 34-1b generating the magnetic field, a driving force is generated to move the first magnet 32-1 in the Y axis direction.

The position sensing unit 70 has the first magnetic sensor 72-1 and the second magnetic sensor 72-2. The arrangement of the first magnetic sensor 72-1 and the second magnetic sensor 72-2 is similar to that in the first embodiment.

The position sensing unit 70 of the present example further has at least one of the third magnetic sensor 72-3 or the fourth magnetic sensor 72-4. The third magnetic sensor 72-3 is arranged to face the first portion 41. The fourth magnetic sensor 72-4 is arranged to face the second portion 42. The first magnetic sensor 72-1 and the third magnetic sensor 72-3 are arranged to be aligned in the Z axis direction. A distance between the first magnetic sensor 72-1 and a lower end of the first portion 41 may be the same as a distance between the third magnetic sensor 72-3 and an upper end of the first portion 41. The distance may be smaller than the distance by which the movable body 10 is able to move in the Z axis direction. The second magnetic sensor 72-2 and the fourth magnetic sensor 72-4 are arranged to be aligned in the Z axis direction. A distance between the second magnetic sensor 72-2 and a lower end of the second portion 42 may be the same as a distance between the fourth magnetic sensor 72-4 and an upper end of the second portion 42. The distance may be smaller than the distance by which the movable body 10 is able to move in the Z axis direction. The third magnetic sensor 72-3 and the fourth magnetic sensor 72-4 are arranged to be aligned in the X axis direction. The third magnetic sensor 72-3 and the fourth magnetic sensor 72-4 may be arranged at positions symmetrical to each other with respect to the boundary line between the first portion 41 and the second portion 42.

Each magnetic sensor 72 may be arranged between the first magnetic field generation unit 34-1a and the second magnetic field generation unit 34-1b in the X axis direction. This makes it possible to offset the magnetic fields which are generated by the first magnetic field generation unit 34-1a and the second magnetic field generation unit 34-1b, and makes it possible for each magnetic sensor 72 to detect the magnetic field from the first magnet 32-1 with a high precision.

Figure 21:
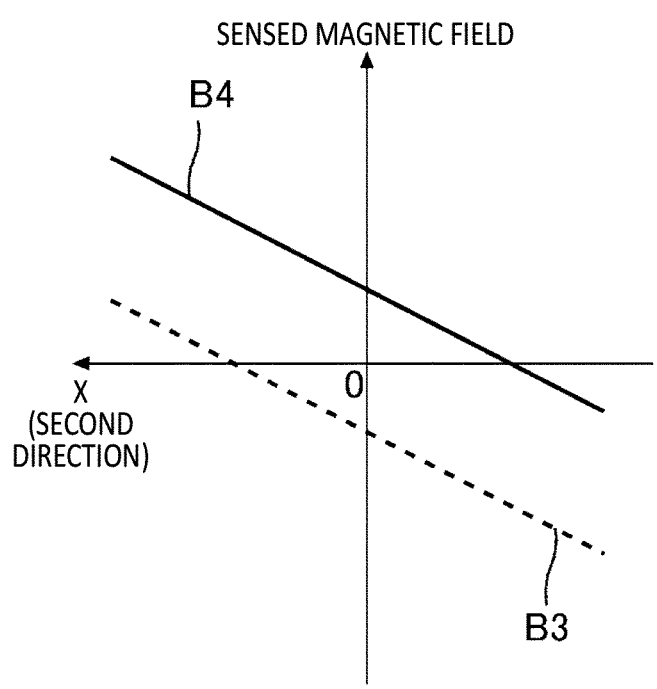
FIG. 21 is a diagram showing a relationship between the position of the movable body 10 in the X axis direction, and the intensities of the magnetic fields sensed by the third magnetic sensor 72-3 and a fourth magnetic sensor 72-4.

FIG. 21 is a diagram showing a relationship between the position of the movable body 10 in the X axis direction, and the intensities of the magnetic fields sensed by the third magnetic sensor 72-3 and a fourth magnetic sensor 72-4. It should be noted that the intensities of the magnetic fields sensed by the first magnetic sensor 72-1 and the second magnetic sensor 72-2 are also similar to those sensed by the third magnetic sensor 72-3 and the fourth magnetic sensor 72-4. When the movable body 10 moves in the positive direction of the X axis, the fourth magnetic field intensity B4 of the fourth magnetic sensor 72-4 and the third magnetic field intensity B3 of the third magnetic sensor 72-3 increase linearly. In addition, when the movable body 10 moves in the negative direction of the X axis, the fourth magnetic field intensity B4 of the fourth magnetic sensor 72-4 and the third magnetic field intensity B3 of the third magnetic sensor 72-3 decrease linearly.

Figure 22:
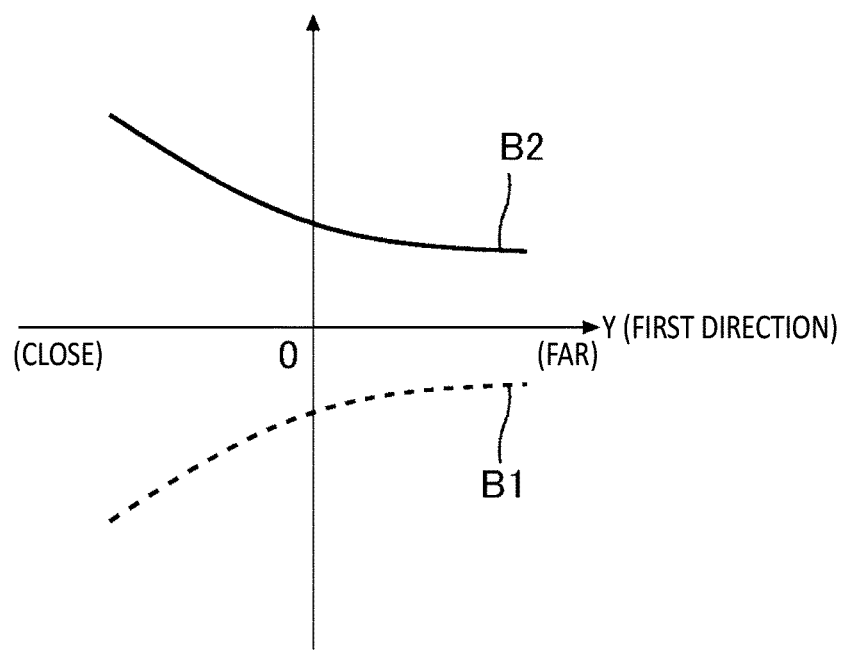
FIG. 22 is a diagram showing a relationship between the position of the movable body 10 in the Y axis direction, and the intensities of the magnetic fields sensed by the first magnetic sensor 72-1 and the second magnetic sensor 72-2.

FIG. 22 is a diagram showing a relationship between the position of the movable body 10 in the Y axis direction, and the intensities of the magnetic fields sensed by the first magnetic sensor 72-1 and the second magnetic sensor 72-2. It should be noted that the intensities of the magnetic fields sensed by the third magnetic sensor 72-3 and the fourth magnetic sensor 72-4 are also similar to those sensed by the first magnetic sensor 72-1 and the second magnetic sensor 72-2. Similarly to the example described in FIG. 11, when the movable body 10 moves in the positive direction of the Y axis, the absolute values of the second magnetic field intensity B2 of the second magnetic sensor 72-2 and the first magnetic field intensity B1 of the first magnetic sensor 72-1 decrease. In addition, when the movable body 10 moves in the negative direction of the Y axis, the absolute values of the second magnetic field intensity B2 of the second magnetic sensor 72-2 and the first magnetic field intensity B1 of the first magnetic sensor 72-1 increase.

Figure 23:
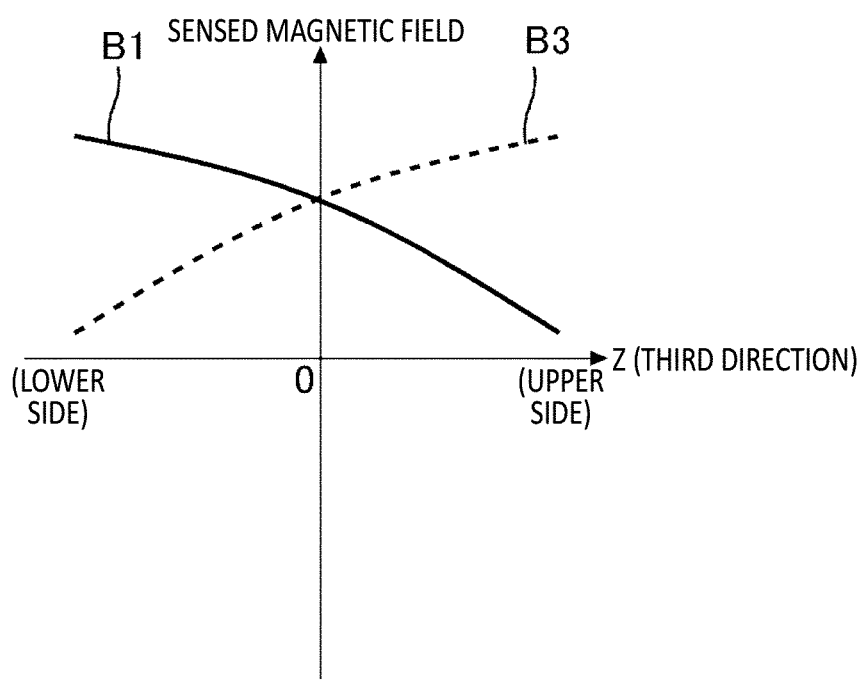
FIG. 23 is a diagram showing a relationship between the position of the movable body 10 in the Z axis direction, and the intensities of the magnetic fields sensed by the first magnetic sensor 72-1 and the third magnetic sensor 72-3.

FIG. 23 is a diagram showing a relationship between the position of the movable body 10 in the Z axis direction, and the intensities of the magnetic fields sensed by the first magnetic sensor 72-1 and the third magnetic sensor 72-3. It should be noted that the intensities of the magnetic fields sensed by the second magnetic sensor 72-2 and the fourth magnetic sensor 72-4 are also similar to those sensed by the first magnetic sensor 72-1 and the third magnetic sensor 72-3.

The magnetic field intensities of the two magnetic sensors 72 aligned in the Z axis direction change by the first magnet 32-1 moving in the Z axis direction. For example, when the first magnet 32-1 moves upward, the distance between the first magnetic sensor 72-1 and the lower end of the first portion 41 becomes close. In this case, the first magnetic field intensity B1 of the first magnetic sensor 72-1 decreases. In addition, when the first portion 41 moves to a position where the first magnetic sensor 72-1 does not overlap the first portion 41, the first magnetic field intensity B1 further decreases. On the other hand, the distance between the third magnetic sensor 72-3 and the upper end of the first portion 41 becomes far, and the third magnetic sensor 72-3 approaches the center of the first portion 41. In this case, the third magnetic field intensity B3 of the third magnetic sensor 72-3 increases. Therefore, it is possible to obtain the characteristic as that shown in FIG. 23.

Similarly to the first embodiment, the position sensing unit 70 calculates the position of the movable body 10 in the X axis direction, based on the sum of the magnetic field intensities which are sensed by the two magnetic sensors 72 arranged adjacent to each other in the X axis direction. The position sensing unit 70 may calculate the position in the X axis direction, based on at least one of the sum (B1+B2) of the first magnetic field intensity B1 and the second magnetic field intensity B2, or the sum (B3+B4) of the third magnetic field intensity B3 and the fourth magnetic field intensity B4. In addition, the position sensing unit 70 may calculate the position in the X axis direction, based on the ratio (B1+B2)/(B1−B2) of the sum and the difference of the first magnetic field intensity B1 and the second magnetic field intensity B2, or may calculate the position in the X axis direction, based on the ratio (B3+B4)/(B3−B4) of the sum and the difference of the third magnetic field intensity B3 and the fourth magnetic field intensity B4. The position sensing unit 70 may use an average value of positions in the X axis direction calculated by two or more methods.

Similarly to the first embodiment, the position sensing unit 70 calculates the position of the movable body 10 in the Y axis direction, based on the difference between the magnetic field intensities which are sensed by the two magnetic sensors 72 arranged adjacent to each other in the X axis direction. The position sensing unit 70 may calculate the position of the movable body 10 in the Y axis direction, based on the difference (B1−B2) between the first magnetic field intensity B1 and the second magnetic field intensity B2. The position sensing unit 70 may calculate the position of the movable body 10 in the Y axis direction, based on the difference (B3−B4) between the third magnetic field intensity B3 and the fourth magnetic field intensity B4. The position sensing unit 70 may use an average value of positions in the Y axis direction calculated by two or more methods.

The position sensing unit 70 calculates the position of the movable body 10 in the Z axis direction, based on the difference between the magnetic field intensities which are sensed by the two magnetic sensors 72 arranged adjacent to each other in the Z axis direction. The position sensing unit 70 may calculate the position in the Z axis direction, based on the difference (B1−B3) between the first magnetic field intensity B1 and the third magnetic field intensity B3, or may calculate the position in the Z axis direction, based on the difference (B2−B4) of the second magnetic field intensity B2 and the fourth magnetic field intensity B4. As shown in FIG. 23, the absolute value of the difference between the magnetic field intensities becomes large as the movable body 10 moves from the origin position. In addition, a sign of the difference between the magnetic field intensities is determined by whether the movable body 10 moves in the positive direction or the negative direction. In addition, the position sensing unit 70 may calculate the position in the Z axis direction, based on a ratio (B1−B3)/(B1+B3) of the difference and the sum of the first magnetic field intensity B1 and the third magnetic field intensity B3, or may calculate the position in the Z axis direction, based on a ratio (B2−B4)/(B2+B4) of the difference and the sum of the second magnetic field intensity B2 and the fourth magnetic field intensity B4. The position sensing unit 70 may use an average value of positions in the Z axis direction calculated by two or more methods.

Fifth Embodiment

Figure 24:
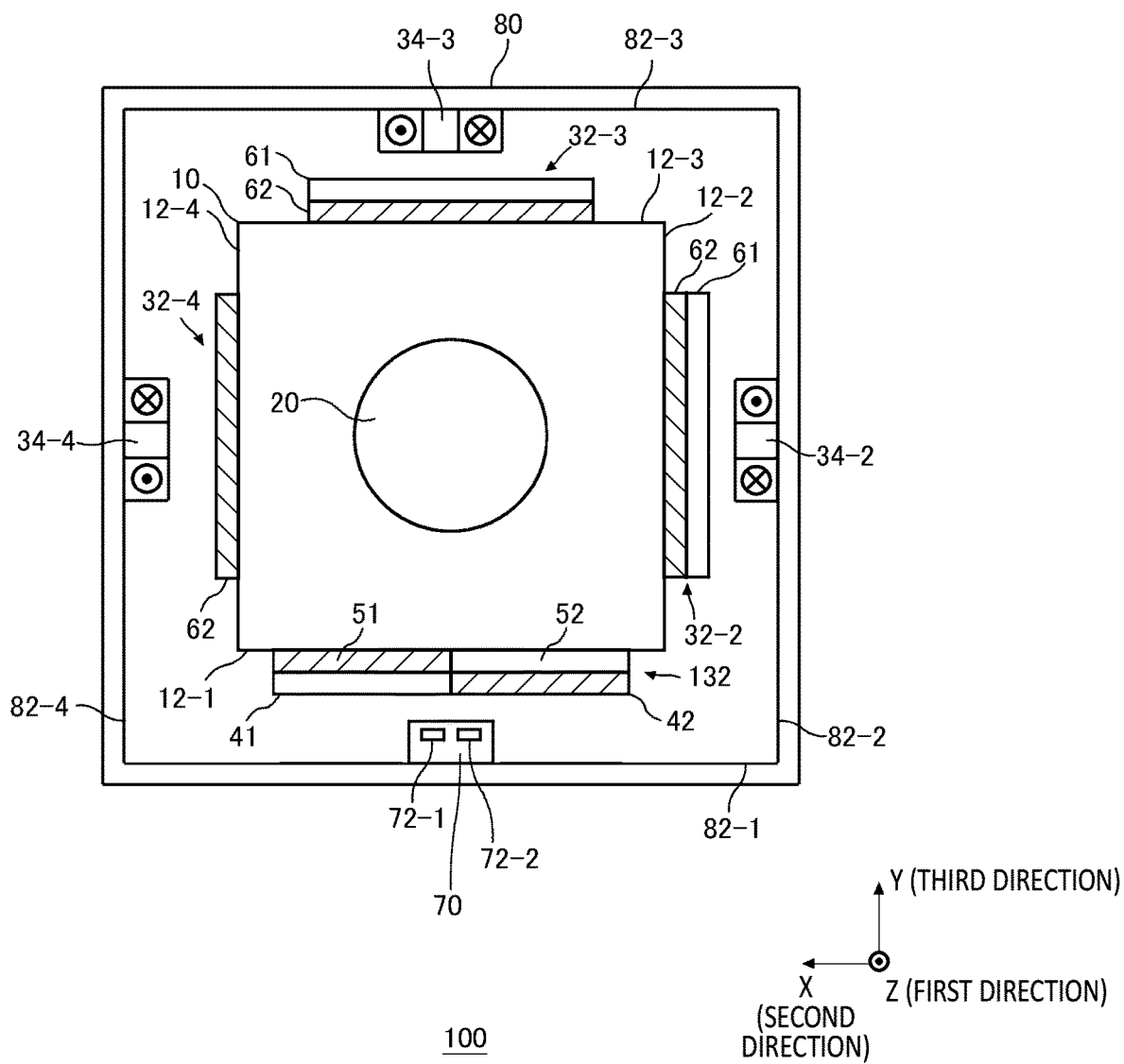
FIG. 24 is a plan view showing an example of the camera module 100 according to a fifth embodiment of the present invention.

FIG. 24 is a plan view showing an example of the camera module 100 according to a fifth embodiment of the present invention. In the present example, the movable body 10 moves in the first direction (the Z axis direction in FIG. 24) parallel to the optical axis, in the second direction (the X axis direction in FIG. 24) intersecting the optical axis, and in the third direction (the Y axis direction in FIG. 24) intersecting both of the first direction, and the second direction.

The camera module 100 of the present example includes the movable body 10, the fixed portion 80, the second magnetic field generation unit 34-2, the third magnetic field generation unit 34-3, a fourth magnetic field generation unit 34-4, the second magnet 32-2, the third magnet 32-3, a fourth magnet 32-4, a sensing magnet 132, and the position sensing unit 70. The movable body 10 and the fixed portion 80 are similar to those in the examples of FIG. 1 to FIG. 23. The magnetic field generation unit 34 and the magnet 32 that are paired constitute the drive unit 30.

The second magnetic field generation unit 34-2 and the second magnet 32-2 generate a driving force for moving the movable body 10 in the X axis direction. The second magnetic field generation unit 34-2 is provided on the second surface 82-2, and the second magnet 32-2 is provided on the second surface 12-2. The second magnetic field generation unit 34-2 and the second magnet 32-2 are similar to the second magnetic field generation unit 34-2 and the second magnet 32-2 in the first embodiment.

The third magnetic field generation unit 34-3 and the third magnet 32-3 generate the driving force for moving the movable body 10 in the Y axis direction. The third magnetic field generation unit 34-3 is provided on the third surface 82-3, and the third magnet 32-3 is provided on the third surface 12-3. The third surface 82-3 is a surface intersecting the second surface 82-2, and the third surface 12-3 is a surface intersecting the second surface 12-2. The third magnetic field generation unit 34-3 and the third magnet 32-3 are similar to the second magnetic field generation unit 34-2 and the second magnet 32-2 in the second embodiment.

The fourth magnetic field generation unit 34-4 and the fourth magnet 32-4 generate the driving force for moving the movable body 10 in the Z axis direction. The fourth magnetic field generation unit 34-4 is provided on a fourth surface 82-4, and the fourth magnet 32-4 is provided on the fourth surface 12-4. The fourth surface 82-4 is a surface on an opposite side of the second surface 82-2, and the fourth surface 12-4 is a surface on an opposite side of the second surface 12-2. The fourth magnetic field generation unit 34-4 and the fourth magnet 32-4 are similar to the third magnetic field generation unit 34-3 and the third magnet 32-3 in the fourth embodiment.

The sensing magnet 132 is provided on one of the first surface 12-1 of the movable body 10 and the first surface 82-1 of fixed portion 80. The sensing magnet 132 has a configuration similar to that of the first magnet 32-1 in any of the first embodiment to the fourth embodiment. The sensing magnet 132 has at least the first portion 41 and the second portion 42. The position sensing unit 70 is provided on the first surface 82-1 of the fixed portion 80. Between the first surface 12-1 of the movable body 10 and the first surface 82-1 of the fixed portion 80, the position sensing unit 70 is provided on a surface on which the sensing magnet 132 is not provided. The position sensing unit 70 is arranged to face the sensing magnet 132, and is configured to sense the position of the movable body 10.

The position sensing unit 70 is configured to detect a magnetic field from the sensing magnet 132, and calculate, based on a detected magnetic field intensity, the position of the movable body 10 in the first direction (the Z axis direction in FIG. 24) parallel to the optical axis, and the position of the movable body 10 in the second direction (the X axis direction in FIG. 24) intersecting the optical axis. The position sensing unit 70 may further calculate the position of the movable body 10 in the third direction (the Y axis direction in FIG. 24) intersecting both of the first direction and the second direction. The position sensing unit 70 has two or more magnetic sensors 72. The configuration of the position sensing unit 70 is similar to the position sensing unit 70 in any of the first embodiment to the fourth embodiment. In addition, the arrangement of the plurality of magnetic sensors 72 and the portion of each polarity of the sensing magnet 132 is similar to the arrangement of the magnetic sensor 72 and each portion of the first magnet 32-1 in any embodiment of the first embodiment to the fourth embodiment.

Such a configuration makes it possible to move the movable body 10 in a plurality of directions, and also to sense the positions of the movable body 10 in the plurality of directions by one position sensing unit 70. Therefore, it is possible to reduce the number of components of the camera module 100, or to reduce the size of the camera module 100.

In the first embodiment to the fourth embodiment, the position sensing unit 70 is arranged on the same surface as the surface on which the first magnetic field generation unit 34-1 is arranged. The position sensing unit 70 of the present example is arranged on a surface different from the surface on which any of the magnetic field generation units 34 is arranged.

In the first embodiment to the fifth embodiment, each of the drive units 30 has a drive magnet. Each of the first magnet 32-1 to the fourth magnet 32-4 is the drive magnet. In the first embodiment to the fourth embodiment, the first magnet 32-1 functions as the drive magnet, and functions as the sensing magnet 132 as well. That is, in the first embodiment to the fourth embodiment, the sensing magnet 132 is a common magnet used for the drive magnet of any of the drive units 30. On the other hand, in the fifth embodiment, the sensing magnet 132 is a magnet different from the drive magnet of any of the drive units 30. Each of the drive units 30 in the fifth embodiment is configured to generate the driving force for moving the movable body 10 by means different from the sensing magnet 132. In the example of FIG. 24, the drive unit 30 moves the movable body 10 by the magnetic force. In another example, the drive unit 30 may move the movable body 10 by using a piezoelectric element, or may move the movable body 10 by another method.

While the embodiments of the present invention have been described, the technical scope of the present invention is not limited to the above described embodiments. It is apparent to persons skilled in the art that various alterations and improvements can be added to the above described embodiments. It is also apparent from the scope of the claims that the embodiments added with such alterations or improvements can be included in the technical scope of the invention.

Note that the operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A camera module comprising:
  a movable body that includes an optical element;

a fixed portion that has a surface facing the movable body in a direction intersecting an optical axis of the optical element;

a first drive unit that has a portion arranged on a surface of the movable body and that is configured to generate a first driving force for moving the movable body in a first direction;

a second drive unit configured to generate a second driving force for moving the movable body in a second direction intersecting both the first direction and the optical axis of the optical element; and a position sensing unit that is arranged on a surface of the fixed portion facing the surface of the movable body, or on the surface of the movable body and that is configured to detect a position of the movable body in the first direction and a position of the movable body in the second direction, wherein the position sensing unit further has
  a first driver configured to drive the first drive unit, based on the position of the movable body in the first direction,
  a second driver configured to drive the second drive unit, based on the position of the movable body in the second direction,
  a plurality of magnetic sensors configured to detect magnetic fields in accordance with the position of the movable body in the first direction and the position of the movable body in the second direction, and
  a signal calculation unit configured to calculate, according to the magnetic fields detected by the plurality of magnetic sensors, the position of the movable body in the first direction and the position of the movable body in the second direction, and wherein the plurality of magnetic sensors, the first driver, the second driver, and the signal calculation unit are provided in one IC chip.

2. The camera module according to claim 1, wherein
the first drive unit has
  a first magnet that is arranged in the movable body, and
  a first magnetic field generation unit that is arranged in the fixed portion to face the first magnet and that is configured to generate the first driving force between the first magnet and itself by generating a variable magnetic field, and
the plurality of magnetic sensors have magnetic sensors that are arranged in the fixed portion to face the first magnet and that are configured to detect a magnetic field from the first magnet.

3. The camera module according to claim 2, wherein
the first magnet has, on a surface facing the position sensing unit,
  a first portion that has a first polarity, and
  a second portion that has a second polarity different from the first polarity and that is arranged to be aligned with the first portion in the first direction or the second direction.

4. The camera module according to claim 3, wherein
the position sensing unit has
  a first magnetic sensor that is arranged to face the first portion of the first magnet, and
  a second magnetic sensor that is arranged to face the second portion of the first magnet.

5. The camera module according to claim 4, wherein
a distance between a center of the first magnetic sensor and a center of the second magnetic sensor is smaller than a distance by which the movable body is able to move in a direction in which the first magnetic sensor and the second magnetic sensor are aligned.

6. The camera module according to claim 4, wherein
the first direction is a direction parallel to the optical axis,
the second direction is a direction intersecting the optical axis and intersecting the surface of the movable body,
the first portion and the second portion of the first magnet are aligned along the first direction, and
the first magnetic field generation unit has a coil that is arranged to face the first portion and the second portion to straddle both of the first portion and the second portion of the first magnet.

7. The camera module according to claim 6, wherein
the first magnet has
  a third portion that is arranged to be aligned with the first portion in a third direction intersecting both of the first direction and the second direction and that has the second polarity, and
  a fourth portion that is arranged to be aligned with the second portion in the third direction and that has the first polarity, and
the position sensing unit further has at least one of a third magnetic sensor that is arranged to face the third portion, or a fourth magnetic sensor that is arranged to face the fourth portion.

8. The camera module according to claim 7, wherein
the first magnetic sensor is configured to detect a first magnetic field intensity,
the second magnetic sensor is configured to detect a second magnetic field intensity, and
the third magnetic sensor is configured to detect a third magnetic field intensity, and
the fourth magnetic sensor is configured to detect a fourth magnetic field intensity, and
the position sensing unit is configured to
  calculate the position of the movable body in the first direction, based on at least one of a sum of the first magnetic field intensity and the second magnetic field intensity, or a sum of the third magnetic field intensity and the fourth magnetic field intensity,
  calculate the position of the movable body in the second direction, based on at least one of a difference between the first magnetic field intensity and the second magnetic field intensity, a difference between the first magnetic field intensity and the third magnetic field intensity, a difference between the second magnetic field intensity and the fourth magnetic field intensity, or a difference between the third magnetic field intensity and the fourth magnetic field intensity, and
  calculate a position of the movable body in the third direction, based on at least one of a sum of the first magnetic field intensity and the third magnetic field intensity, or a sum of the second magnetic field intensity and the fourth magnetic field intensity.

9. The camera module according to claim 4, wherein
the first magnetic sensor is configured to detect a first magnetic field intensity,
the second magnetic sensor is configured to detect a second magnetic field intensity, and
the position sensing unit is configured to calculate the position of the movable body in the first direction, based on at least one of a sum or a difference of the first magnetic field intensity and the second magnetic field intensity, and is configured to calculate the position of the movable body in the second direction, based on at least one of the sum or the difference of the first magnetic field intensity and the second magnetic field intensity.

10. The camera module according to claim 9, wherein
the first direction and the second direction are directions intersecting the optical axis,
the first portion and the second portion of the first magnet are aligned along the second direction, and
the first magnetic field generation unit has a first coil that is arranged to face the first portion of the first magnet.

11. The camera module according to claim 10, wherein
the first magnetic field generation unit further has a second coil that is arranged to face the second portion of the first magnet and that is configured to generate a magnetic field in a direction opposite to that generated by the first coil.

12. The camera module according to claim 11, wherein
the first magnetic sensor and the second magnetic sensor are arranged between the first coil and the second coil.

13. The camera module according to claim 10, wherein
the position sensing unit further has at least one of
a third magnetic sensor that is arranged to be aligned with the first magnetic sensor in a direction parallel to the optical axis, or
a fourth magnetic sensor that is arranged to be aligned with the second magnetic sensor in the direction parallel to the optical axis.

14. The camera module according to claim 13, wherein
the position sensing unit is configured to calculate a position of the movable body in the direction parallel to the optical axis, based on at least one of a difference between a magnetic field intensity which is detected by the first magnetic sensor and a magnetic field intensity which is detected by the third magnetic sensor, or a difference between a magnetic field intensity which is detected by the second magnetic sensor and a magnetic field intensity which is detected by the fourth magnetic sensor.

15. A camera module comprising:
a movable body that includes an optical element and that moves in a direction intersecting an optical axis of the optical element;
a fixed portion that has a surface facing the movable body in the direction intersecting the optical axis;
a sensing magnet that is provided in one of the movable body and the fixed portion; and
a position sensing unit that has a magnetic sensor arranged in another one of the movable body and the fixed portion to face the sensing magnet and that is configured to sense a position of the movable body, wherein
the position sensing unit is configured to detect a magnetic field from the sensing magnet, and calculate, based on a detected magnetic field intensity, a position of the movable body in a first direction parallel to the optical axis, and a position of the movable body in a second direction intersecting the optical axis.

16. The camera module according to claim 15, wherein
the sensing magnet has, on a surface facing the position sensing unit,
a first portion that has a first polarity, and
a second portion that has a second polarity different from the first polarity and that is arranged to be aligned with the first portion in the first direction or the second direction.

17. The camera module according to claim 16, wherein
the position sensing unit has a first magnetic sensor that is arranged to face the first portion of the sensing magnet, and
a second magnetic sensor that is arranged to face the second portion of the sensing magnet.

18. The camera module according to claim 17, wherein
the first magnetic sensor is configured to detect a first magnetic field intensity,
the second magnetic sensor is configured to detect a second magnetic field intensity, and
the position sensing unit is configured to calculate the position of the movable body in the first direction, based on one of a sum and a difference of the first magnetic field intensity and the second magnetic field intensity, and is configured to calculate the position of the movable body in the second direction, based on another one of the sum or the difference of the first magnetic field intensity and the second magnetic field intensity.

19. The camera module according to claim 18, further comprising:
one or more drive units configured to generate driving forces for moving the movable body, wherein
each of the one or more drive units has
a drive magnet that is provided in one of the movable body and the fixed portion, and
a magnetic field generation unit that is provided in another one of the movable body and the fixed portion, and
the sensing magnet is a common magnet used for the drive magnet of any of the drive units.

20. The camera module according to claim 17, further comprising:
one or more drive units configured to generate driving forces for moving the movable body, wherein
each of the one or more drive units is configured to generate the driving force by means different from the sensing magnet.

21. An IC chip configured to detect positions, in a first direction and a second direction, of a movable body that includes an optical element and to drive the movable body in the first direction and the second direction, the IC chip comprising: in a built-in manner:
a plurality of magnetic sensors configured to detect magnetic fields in accordance with the positions of the movable body in the first direction and the second direction;
a signal calculation unit configured to calculate the positions of the movable body in the first direction and the second direction according to the magnetic fields sensed by the plurality of magnetic sensors;
a first driver configured to drive the movable body in the first direction, based on the position of the movable body in the first direction; and
a second driver configured to drive the movable body in the second direction, based on the position of the movable body in the second direction.

22. The IC chip according to claim 21, wherein
the plurality of magnetic sensors are configured to detect a magnetic field from a magnet arranged in the movable body.

23. The IC chip according to claim 21, wherein
the plurality of magnetic sensors have a first magnetic sensor and a second magnetic sensor, and
a distance between a center of the first magnetic sensor and a center of the second magnetic sensor is smaller than a distance by which the movable body is able to move in a direction in which the first magnetic sensor and the second magnetic sensor are aligned.

* * * * *